US008510597B2

(12) United States Patent
Swift et al.

(10) Patent No.: US 8,510,597 B2
(45) Date of Patent: Aug. 13, 2013

(54) PROVIDING RESTARTABLE FILE SYSTEMS WITHIN COMPUTING DEVICES

(75) Inventors: Michael M. Swift, Madison, WI (US); Andrea C. Arpaci-Dusseau, Madison, WI (US); Remzi H. Arpaci-Dusseau, Madison, WI (US); Swaminathan Sundararaman, Madison, WI (US); Sriram Subramanian, Madison, WI (US); Abhishek Rajimwale, Santa Clara, CA (US)

(73) Assignee: Wisconsin Alumni Research Foundation, Madison, WI (US)

( * ) Notice: Subject to any disclaimer, the term of this patent is extended or adjusted under 35 U.S.C. 154(b) by 372 days.

(21) Appl. No.: 13/023,354

(22) Filed: Feb. 8, 2011

(65) Prior Publication Data

US 2012/0204060 A1    Aug. 9, 2012

(51) Int. Cl.
*G06F 11/00* (2006.01)

(52) U.S. Cl.
USPC .................................... 714/15; 714/2

(58) Field of Classification Search
USPC ................ 714/15, 16, 18, 2, 20; 719/321
See application file for complete search history.

(56) References Cited

U.S. PATENT DOCUMENTS

| 7,017,075 | B1 * | 3/2006 | Peters ........................... 714/15 |
| 7,673,174 | B2 | 3/2010 | Swift et al. |
| 2006/0070089 | A1 * | 3/2006 | Shoaib et al. ................ 719/321 |

OTHER PUBLICATIONS

Jones, "Anatomy of the Linux file system: A layered structure-based review," Oct. 30, 2007, found at http://www.ibm.com/developerworks/linux/library/l-linux-filesystem/, 10 pp.
Conrad, "Tutorial: Function Interposition in Linux," Jun. 30, 2009, found at http://www.jayconrad.com/cgi/view_post.py?23, 3 pp.
Swift et al., "Recovering Device Drivers," in Proceedings of the 6th ACM/USENIX Symposium on Operating Systems Design and Implementation, San Francisco, CA, Dec. 2004, 15 pp.
Sundararaman et al., "Why panic()? Improving Reliability with Restartable File Systems," Fast 2010, Feb. 2010, 5 pp.

* cited by examiner

*Primary Examiner* — Dieu-Minh Le
(74) *Attorney, Agent, or Firm* — Shumaker & Sieffert, P.A.

(57) ABSTRACT

In general, techniques are described for enabling a restartable file system. A computing device comprising a processor that executes an operating system may implement the techniques. The processor executes kernel and file system functions of the operating system to perform an operation, where both types of functions call each other to perform the operation. The operating system stores data identifying those of the kernel functions that called the file system functions. In response to determining that one of the file system functions that was called has failed, the operating system accesses the data to identify one of the kernel functions that most recently called one of the file system functions, and returns control to the identified one of the kernel functions without executing any of the file system functions called after the identified one of the kernel functions and prior to the one of the file system functions that failed.

55 Claims, 12 Drawing Sheets

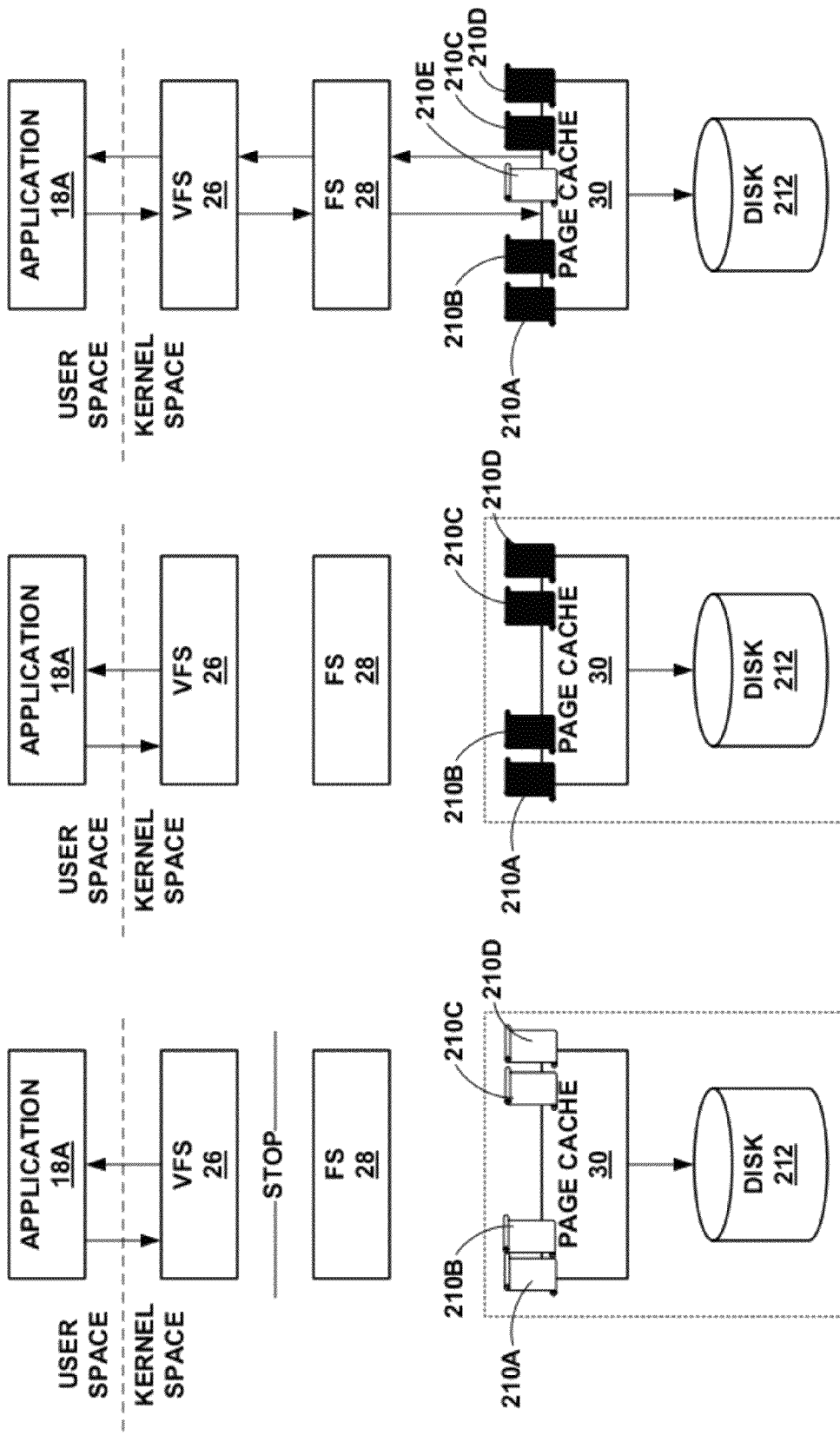

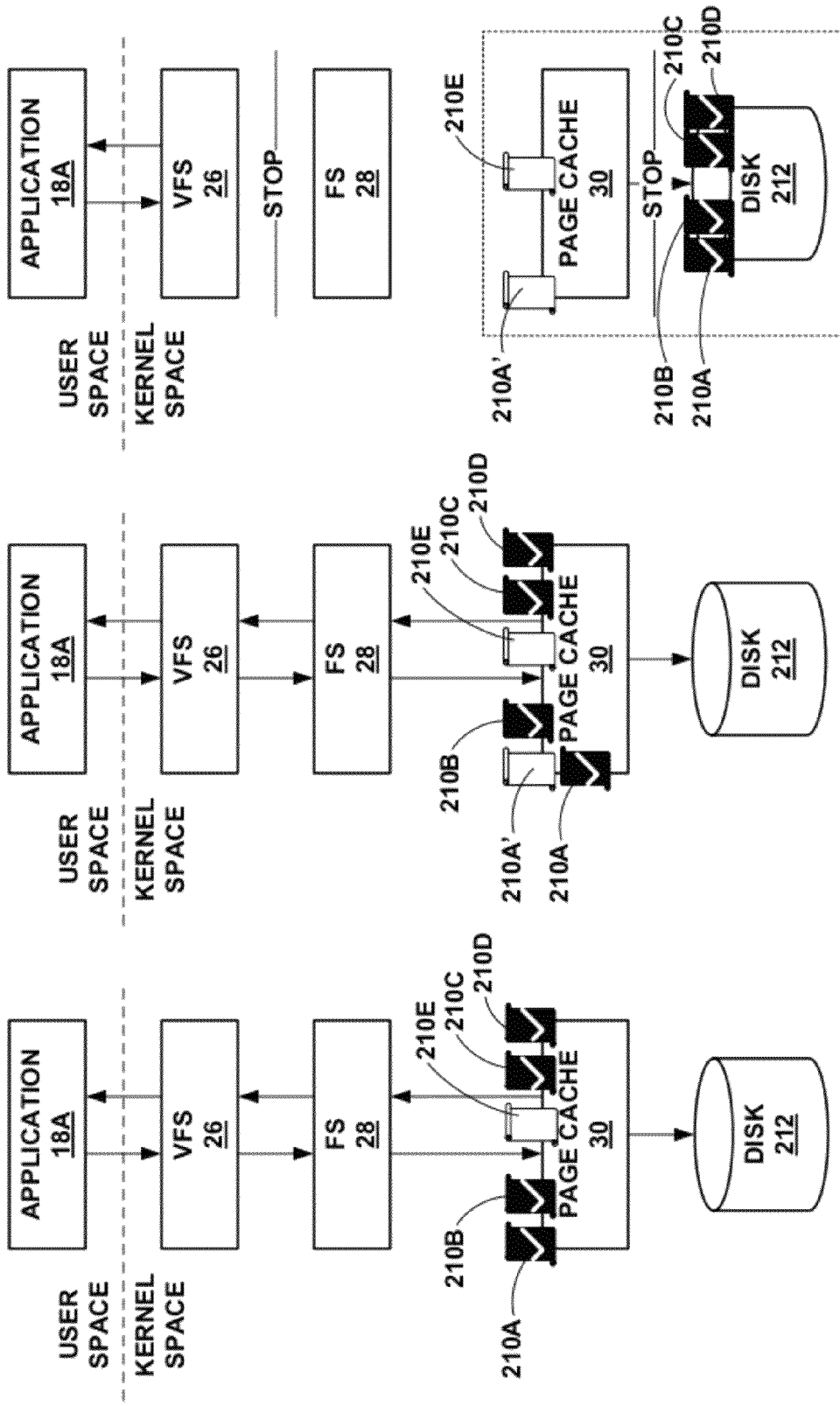

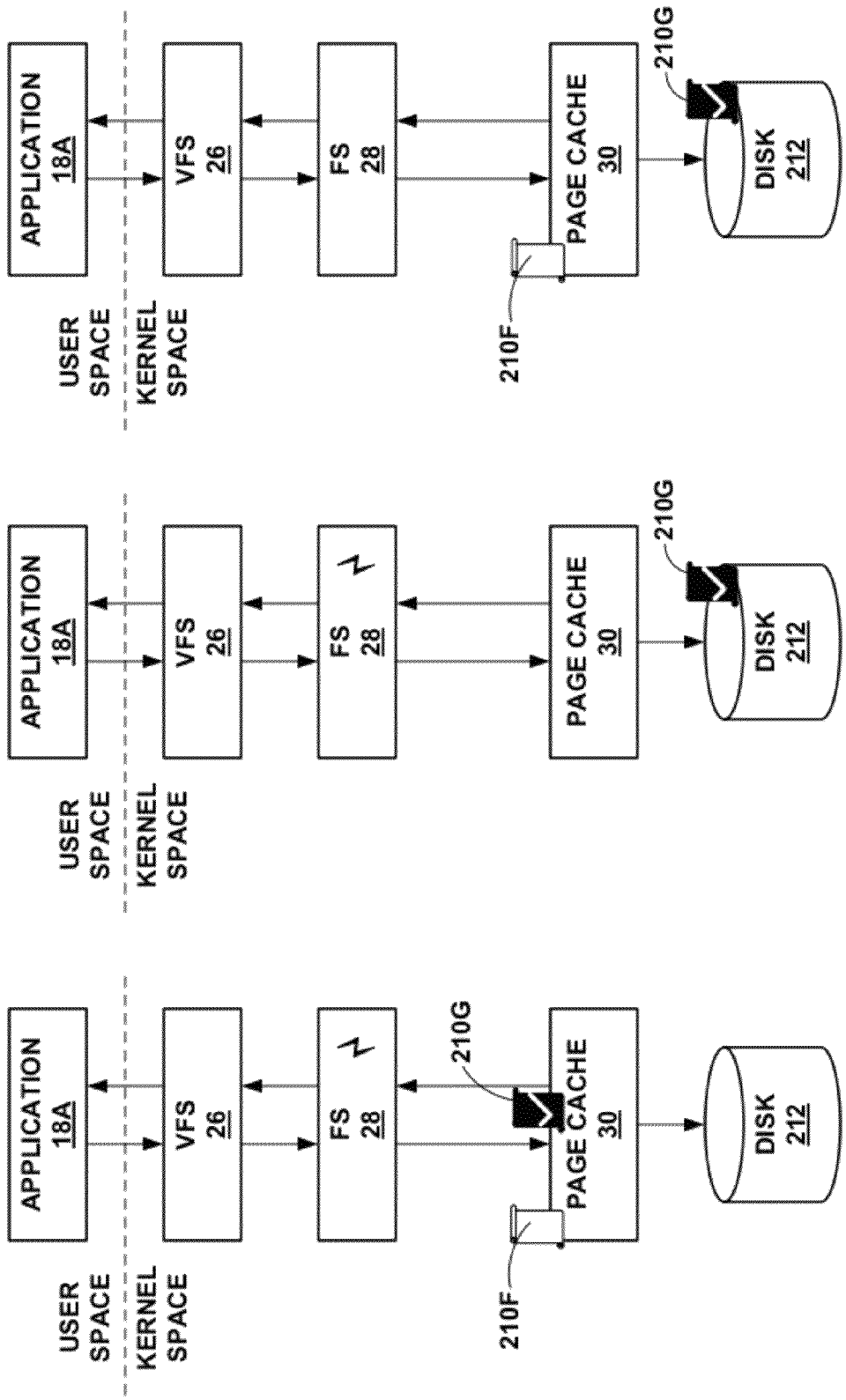

PROVIDING RESTARTABLE FILE SYSTEMS WITHIN COMPUTING DEVICES

This invention was made with government support under 0621487 and 0509474 awarded by the National Science Foundation. The government has certain rights in the invention.

TECHNICAL FIELD

The invention relates to computing devices and, more particularly, the execution of file systems within computing devices.

BACKGROUND

A computing device typically executes software referred to as an "operating system" to provide an environment in which programs or other executables, generally referred to as "software applications," may execute. The operating system manages the hardware resources of the computing device, and typically presents what is referred to as an application programming interface (API) with the software applications interact to utilize the underlying hardware resources provided by the computing devices. The hardware resources typically include storage devices (e.g., hard drives, compact disc drives, and digital video disc drives), memories (e.g., random access memory, dynamic random access memory, and static random access memory), graphics cards, card readers, printers, keyboards, mice, network interfaces or any other type of hardware provided by or included within computing devices. The applications generally invoke one or more functions provided by the API to access this hardware through the operating system. The operating system generally manages any interrupts, exceptions and faults that result from such function calls and otherwise acts as an intermediary between the applications and the underlying hardware.

To provide the applications access to data stored to memories and storage devices, the operating system typically includes internal software that provides one or more file systems. A file system is a logical construct that defines the manner in which data is stored on media, such as permanent storage devices accessible to the computing system. Typically, the file system components of the operating system operates on discrete portions of data referred to as files and organizes these files into a hierarchical structure for the storage, organization, manipulation and retrieval by the operating system. The hierarchical structure is generally defined in terms of directories (or so-called "folders") and sub-directories (so-called "sub-folders"). The file system maps various physical areas of the underlying storage devices to the directories and sub-directories of the hierarchical structure and defines which areas are used to store which files and which areas are currently available to store additional files. For example, the file system may store data mapping at least a portion of a file to a particular sector of a hard drive, as well as, other metadata defining the file name, date of file creation, size of the file, and the like.

While operating systems are carefully constructed to provide a secure and consistent operating environment for the software applications, the operating system may experience faults that crash or otherwise prevent successful execution of the operating system. Faults that occur in the file system, for example, due to software errors or so-called "bugs" in the program code providing the file system of the operating system or transient faults in the device hardware, generally lead to total failure of the entire operating system as a result of the importance of the file system to stable execution of the operating system. To illustrate, a fault in the file system code may impact the mapping of data to areas of the memories and storage devices, which may effectively lead to loss of data. Consequently, in response to file system faults or other failures, if handled gracefully, the operating system typically, if handled gracefully, requests that the computing device be restarted to overcome the failure or, if not well handled, shuts down without much in the way of warning, forcing a restart of the computing device. This forced shutdown or restart impacts the usability of the computing device. In addition, the current state of software applications being executed by the operating system, as well as, some incremental user data not yet written to the storage devices may be lost. The operating system may attempt data recovery operations in an attempt to recover this lost application state data and incremental user data but these recovery operations are usually only partially successful.

SUMMARY

In general, techniques are described for providing restartable file systems of operating systems within computing devices. As described, the techniques may allow a computing device to avoid a restart of the operating systems to overcome certain faults or other failures with the file system code of the operating system. In order to provide this type of restartable file system, the techniques create what may be viewed as a logical membrane around the file system of the operating system to better manage the file system and, in instances of file system failure, isolate the failure to the file system without overly impacting either execution of the supporting components of the operating system or software applications executing within the operating environment provided by the operating system.

The techniques provide the logical membrane around the file system code through the creation of file system checkpoints and inter-checkpoint logs. In response to a file system failure, the techniques effectively isolate the file system by delaying pending, but not yet started, file system processes and halting those file system processes currently being executed. Once halted, the techniques unwind the existing file system processes to effectively remove these current processes by leveraging current fault management aspects of the operating system. After unwinding the processes, the techniques may un-mount the faulted file system, remount the file system from the last file system checkpoint, and rebuild the previous file system state based on the last checkpoint and inter-checkpoint logs. Once the file system is rebuilt, the techniques may resume those halted file system processes and begin accepting the pending but not yet started file system processes. Through isolation of the file system in this manner, the techniques may avoid restarting the operating systems in response to file system failure, which may greatly improve the user experience associated with operating systems that feature these techniques while also promoting more stable and functional operating systems.

In one embodiment, a method comprises executing an operating system with a computing device to provide an operating environment for execution of a software application, receiving a request from the software application with the operating system, wherein the request specifies an operation to be performed by the operating system with respect to one of the plurality of files managed by a file system of the operating system and executing, with the computing device, one or more kernel functions of the operating system and one or more file system functions provided by program code of the file system to perform the operation, wherein the kernel functions call the file system functions to perform the operation, and wherein the file system functions also call the kernel functions to perform the operation. The method also comprises maintaining a stack with the computing device that stores data identifying those of the kernel functions that called the file system functions but not those of the file system functions that called the kernel functions, in response to determining that one of the file system functions that was called has failed, accessing the stack with the computing device to identify one of the kernel functions that most recently called one of the file system functions and returning control of execution to the identified one of the kernel functions that most recently called the one of the file system functions without executing any of the file system functions called after the one of the kernel functions that most recently called the one of the file system functions but before the one of the file system functions that failed. The method further comprises detecting attempted execution of a second one of the file system functions after returning control of execution to the identified first one of the kernel functions, in response to detecting the attempted execution of the second one of the file system functions, accessing the stack to identify a second one of the kernel functions that most recently called the second one of the file system functions for which execution was attempted and returning control of execution to the identified second one of the kernel functions without executing the second one of the file system functions.

In another embodiment, a computing device comprising a processor, a storage device that stores at least some of a plurality of files and an operating system executed by the processor to provide an operating environment for execution of a software application and receive a request from the software application executing in the operating environment, wherein the request specifies an operation to be performed by the operating system with respect to one of the plurality of files managed by a file system of the operating system. The processor executes one or more kernel functions of the operating system and one or more file system functions provided by program code of the file system to perform the operation, wherein the kernel functions call the file system functions to perform the operation, and wherein the file system functions also call the kernel functions to perform the operation. The operating system maintains a stack that stores data identifying those of the kernel functions that called the file system functions but not those of the file system functions that called the kernel functions, in response to determining that one of the file system functions that was called has failed, accesses the stack to identify one of the kernel functions that most recently called one of the file system functions, and returns control of execution to the identified one of the kernel functions that most recently called the one of the file system functions without executing any of the file system functions called after the one of the kernel functions that most recently called the one of the file system functions but before the one of the file system functions that failed. The operating system also detects attempted execution of a second one of the file system functions after returning control of execution to the identified first one of the kernel functions, in response to detecting the attempted execution of the second one of the file system functions, accessing the stack to identify a second one of the kernel functions that most recently called the second one of the file system functions for which execution was attempted, and returns control of execution to the identified second one of the kernel functions without executing the second one of the file system functions.

In another embodiment, a non-transitory computer-readable medium comprising instructions that, when executed, cause one or more processors to execute an operating system to provide an operating environment for execution of a software application, receive a request from the software application with the operating system, wherein the request specifies an operation to be performed by the operating system with respect to one of the plurality of files managed by a file system of the operating system, execute one or more kernel functions of the operating system and one or more file system functions provided by program code of the file system to perform the operation, wherein the kernel functions call the file system functions to perform the operation, and wherein the file system functions also call the kernel functions to perform the operation, maintain a stack that stores data identifying those of the kernel functions that called the file system functions but not those of the file system functions that called the kernel functions, in response to determining that one of the file system functions that was called has failed, access the stack to identify one of the kernel functions that most recently called one of the file system functions and return control of execution to the identified one of the kernel functions that most recently called the one of the file system functions without executing any of the file system functions called after the one of the kernel functions that most recently called the one of the file system functions that failed but before the one of the file system functions that failed. The non-transitory computer-readable medium also comprises instruction that, when executed, cause the one or more processors to detect attempted execution of a second one of the file system functions after returning control of execution to the identified first one of the kernel functions, in response to detecting the attempted execution of the second one of the file system functions, access the stack to identify a second one of the kernel functions that most recently called the second one of the file system functions for which execution was attempted and return control of execution to the identified second one of the kernel functions without executing the second one of the file system functions.

In another embodiment, a method comprises executing a first software module with one or more computing devices, executing a second software module different than the first software module with the one or more computing devices; wherein the first software module calls one or more functions of the second software module to perform an operation, and wherein the second software module calls one or more functions of the first software module to perform the operation and maintaining a stack with the one or more computing devices that stores data identifying those of the one or more functions of the first software module that called the one or more functions of the second software module but not those of the one or more functions of the second software module that called the one or more functions of the first software module. The method also comprises, in response to determining that one of the one or more functions of the second software module that was called has failed, accessing the stack with the one or more computing devices to identify one of the one or more functions of the first software module that most recently called one of the one or more functions of the second software module and returning control of execution to the identified one of the one or more functions of the first software module that most recently called the one of the one or more functions of the second software module without executing any of the one or more functions of the second software module called after the one of the one or more functions of the first software module that most recently called the one of the one or more functions of the second software module but before the one of the one or more functions of the second software module that failed. The method further comprises detecting attempted execution of a second one of the functions of the second software module after returning control of execution to the identified first one of the functions of the first software module, in response to detecting the attempted execution of the second one of the functions of the second software module, accessing the stack to identify a second one of the functions of the first software module that most recently called the second one of the functions of the second software module for which execution was attempted and returning control of execution to the identified second one of the functions of the first software module without executing the second one of the functions of the second software module.

The details of one or more embodiments of the techniques are set forth in the accompanying drawings and the description below. Other features, objects, and advantages of the techniques will be apparent from the description and drawings, and from the claims.

BRIEF DESCRIPTION OF DRAWINGS

FIGS. 8A-8I are block diagrams illustrating exemplary operation of an operating system in implementing various aspects of the file system restoration techniques described in this disclosure.

DETAILED DESCRIPTION

Figure 1:
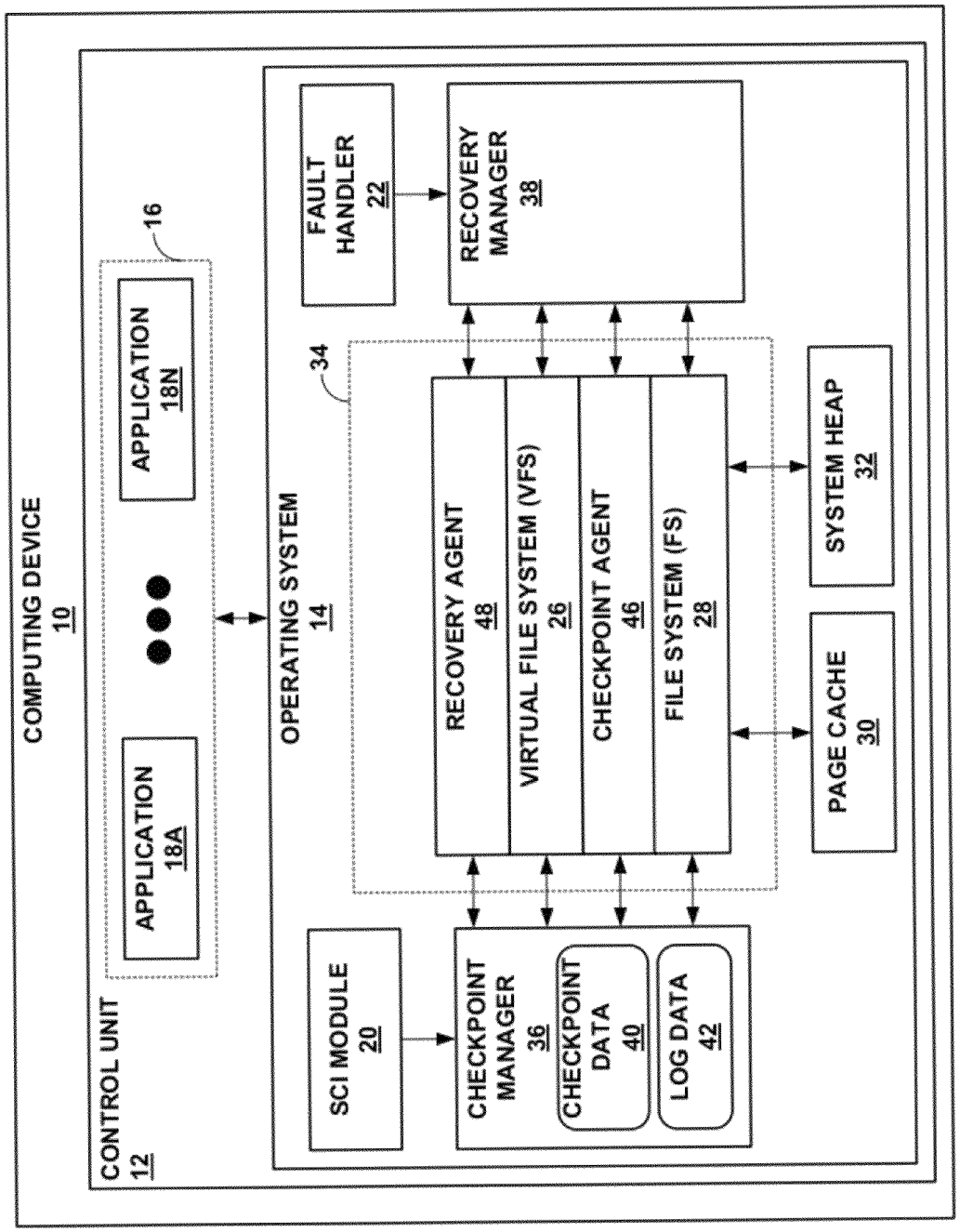
FIG. 1 is a block diagram illustrating an example computing device that implements the file system restoration techniques described in this disclosure.

FIG. 1 is a block diagram illustrating an example computing device 10 that implements the file system restoration techniques described in this disclosure. Computing device 10 may represent any common computing device, including a laptop computer, a desktop computer, a workstation, a so-called "netbook," a personal digital assistant (PDA), a cellular phone (including so-called "smart phones"), a global positioning system (GPS) device, a personal media player (PMP), or any other device that executes an operating system providing a file system.

As shown in the example of FIG. 1, computing device 10 includes a control unit 12. Control unit 12 may represent one or more processors (not shown in FIG. 1) that execute software instructions, such as those used to define a software or computer program, stored to a computer-readable storage medium (again, not shown in FIG. 1), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, control unit 12 may represent dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 12 executes an operating system 14, which represents software that generally provides an execution environment 16 in which software applications 18A-18N ("applications 18") may execute. In providing this execution environment 18, operating system 14 enables applications 18 to interact or otherwise interface with the underlying physical hardware of computing device 10, which is generally represented by control unit 12 to the extent that control unit 12 may represent processors, memories and storage drives and/or dedicated hardware. While not shown in the example of FIG. 1, computing device 10 may include other hardware, such as busses, television capture cards, graphic cards, network interfaces, wireless communication interfaces, keyboards, mice, touch screens, or any other type of hardware that is commonly included within a computing device.

In providing this execution environment, operating system includes a system call interface (SCI) module 20 ("SCI module 20") that presents an interface by which applications 18 may invoke functions provided by operating system 14 for use in interfacing with operating system 14. Through these functions of SCI module 20, applications 18 may communicate with operating system 14. SCI module 20 provides standard routines or functions for many common operations, including reading and writing from memory or storage drives, inter-process or thread communication, or any other operation that requires privileges beyond ordinary user privileges to perform. Common system calls may include an open system call to open a file, a write system call to write a file, a read system call to read a file, a close system call to close an open file, a wait system call to wait for a particular thread or a group of threads, a fork system call that forks a process, an exit system call and a kill system call to kill or otherwise terminate a process. The term "process" refers to an instance of a computer program, such as one of applications 18, that is being executed. A process may include one or more threads of execution that execute instructions concurrently. A thread refers to the smallest unit of execution that can be scheduled by an operating system and generally represents a sequence of one or more software instructions executed by the processor In the example of FIG. 1, applications 18 currently being executed by control unit 12 may represent processes or instances of the underlying computer program stored to a memory and/or storage device. That is, applications 18 may represent computer programs when stored to memory or a storage device and processes when executed. In the current example of FIG. 1, it is assumed that applications 18 are processes currently being executed by control unit 12. Applications 18 may include third-party applications that are not provided with operating system 14 and applications 18 that are provided with operating system 14. Thus, while shown executing outside of operating system 14, one or more of applications 20 may execute within operating system 14, where these operating system applications may include system utilities and other processes that require privileges outside of ordinary user privileges to operate. Consequently, the techniques should not be limited in this respect to the example of FIG. 1.

Operating system 14 also includes a fault handler 22 that represents software for handling operating system faults. Fault handler 22 may provide certain fault functions used by other aspects or portions of the operating system to signal faults or other unexpected behavior. For example, the Linux operating system provides a panic function for use by other aspects or portions of the Linux operating system in signaling detection of an internal fatal error from which this aspect or portion of the operating system cannot recover. Fault handler 22 may handle faults issued from both software and hardware.

Operating system 14 further includes a virtual file system (VFS) 26 and a file system 28 to manage the storage and retrieval of data from underlying memories and physical drives, such as hard drives, optical drives, so-called "thumb drives," or any other type of volatile or non-volatile memory and storage devices. VFS 26 provides a layer of abstraction between FS 28 and operating system 14 so as to present a uniform interface to operating system 14 while supporting multiple different types of file systems that may each have a different interface. That is, each file system may include its own interface by which to read and write data, maintain directories (or "folders" in the Windows operating system), and otherwise interact with the file system. Rather than require operating system 14 to natively support the interface of each and every file system and make this interface available to each of applications 18, VFS 26 instead provides a uniform interface by which to access these different file systems. In providing this uniform interface, VFS 26 virtualizes the underlying file system in a manner such that it appears as one file system to operating system 14, hence the name "virtual file system." In response to operating system 14 invoking various functions provided by this interface, VFS 26 translates these virtual interface function calls into file system-specific function calls.

File system 28 may represent any type of file system commonly supported by an operating system. Example file systems include an extended file system known commonly as "ext," a second extended file system commonly referred to as "ext2," a third extended file system commonly known as "ext3," a Unix file system (UFS), a hierarchical file system (HFS), a hierarchical file system plus (HSF+), a file allocation table (FAT) file system (including the FAT 12, FAT16, FAT32 and exFAT file systems), a new technology file system (NTFS), and a high performance file system (HPFS) to name a few. File system 24 generally stores data defining a hierarchical directory structure comprised of directories and sub-directories. File system 28 stores data associating a file to at least one of the directories or sub-directories of the hierarchical directory structure. File system 28 also maintains data identifying the location of the file, whether this location is a local memory or storage device or a remote or networked memory or storage device. As noted above, file system 28 also includes code that provides a file system-specific interface by which the files may be manipulated within the file system, e.g., moved within, deleted from, copied, read from or written to the hierarchical directory structure. While shown as including only a single file system 28, the techniques may be implemented with respect to any number of file systems similar to file system 28. Accordingly, the techniques should not be limited in this respect to the example of FIG. 1.

The program code of file system 28 may interface or otherwise interact with a number of other aspects or portions of operating system 14 in providing access to the underlying data. For example, file system 28 may interface with a page cache 30 that provides a transparent buffer in memory (such as RAM) for the storage of so-called pages of data from the hard drive or other physical storage devices to facilitate quicker access by the operating system to these pages of data. File system 28 may also interface with a system heap 32, which represents a heap data structure in a portion of memory available for use by the operating system for storing dynamically allocated data structures and run-time data. System heap 32 may be distinguished from an application heap in that system heap 32 is only available for use by operating system 14 while the application heap may be used by applications 20.

In addition, file system 28, as mentioned above, stores a large amount of state information pertaining to the various state of files in the hierarchical data structure, such as whether a file is open, in the process of being edited, in the process of being read, in the process of being written, or locked. File system 28 also maintains or otherwise stores the location of the file in terms of a physical address and in terms of its location or position within the hierarchical data structure. File system 28 may store this data for hundreds, thousands, or even greater number of file. File system 28 also ensures the integrity of the files, as corrupted files represents lost data that may impact the user and/or the execution of the operating system or applications. File system 28 further ensures the integrity of the state data, as corrupted state data may lead to overwriting valid data in a disk drive or other fault write or read that corrupts files.

Because file system 28 interfaces with a wide number of portions or aspects of operating system 14 and maintains or otherwise stores a large amount of state data, faults occurring in file system 28 are often debilitating in terms of the continued execution of the hosting operating system, i.e., operating system 14 in this example, and require restart of this operating system 14 to overcome the faults. These faults are often a result of software bugs in file system 28, where such bugs are difficult to eliminate from file system 28 due in part to its complexity and size. Moreover, new file systems are frequently being introduced to accommodate new uses of computing devices and files. These new file systems may not be as well tested as older and more hardened file systems that have undergone repeated updates to correct for these deficiencies. As a result, software bugs may be considered an inevitable part of file systems due to their complex, highly stateful and evolving nature.

In encountering a fault, file systems ordinarily resort to the above mentioned panic function, which typically causes fault handler 22 to report the fault by way of a fault code and provide an accompanying kernel memory dump to facilitate some amount of debugging. In Windows operating systems, this report is commonly known as "the blue screen of death" because the screen that provides this report and memory dump has a blue colored background. In any event, once fault handler 22 issues this report and memory dump, the operating system becomes unresponsive and halts the execution of applications 20 and any other process executing within the computing device. The user typically must restart the computing device, which in turn restarts the operating system. The restarted operating system reloads the file system, but any data not saved before the panic function was invoked is more than likely lost considering that this data was more than likely stored to volatile memory, such as RAM, and was not written to a storage device prior to the occurrence of the fault. While the interruption in execution may impact usability of the computing device, the loss of data may negatively impact the user experience, especially if that data was attributed some importance by a user.

In accordance with the techniques described in this disclosure, operating system 14 constructs what may be considered a membrane 34 around file system 28 that enables better management of file system 28 and, in instances of file system failure, isolate the failure to file system 28 without overly impacting either execution of supporting operating system 14 or applications 18 executing within operating or execution environment 16 provided by operating system 14. This membrane 34 effectively represents a way by which to carefully monitor and log the operation of underlying file systems 28. The monitoring and logging occurs primarily by way of file system snapshots or checkpoints in which the logical or transient state of file system 28, page cache 30 and the underlying storage devices are captured. The monitoring and logging also occurs by way of inter-checkpoint logging to capture the state of file system 28, page cache 30 and the underlying storage devices between checkpoints.

In response to detecting the occurrence of a fault in file system 28, membrane 34 may prevent successive file system operations from reaching file system 28. In this sense, membrane 34 may be considered selectively permeable in that file system operations invoked by operating system 14 either on behalf of operating system 14 itself or applications 18 may only be permitted to permeate membrane 34 during select times. Membrane 34 may also block file system operations when checkpointing or performing other logging operations. Membrane 34 halts or otherwise prevents operations from reaching file system 28 and, in some instances, virtual file system 26 so as to isolate file system 28 from the remaining portions of operating system 14. This isolation enables file system 28 to be unmounted, remounted and restored without overly impacting either execution of supporting operating system 14 or applications 18 executing within operating or execution environment 16 provided by operating system 14.

To provide this logical membrane 34, operating system 14 has been adapted to provide a checkpoint manager 36 and a recovery manager 38. Checkpoint manager 36 represents a module responsible for storing checkpoint data 40 and inter-checkpoint log data 42 ("log data 42"). Checkpoint data 40 represents data that defines one or more checkpoints capturing the current state of file system 28, page cache 30 and any underlying storage devices. Log data 42 represents any state changes to the most recent checkpoint and, for this reason, are referred to as inter-checkpoint log data. Recovery manager 38 represents a file system recovery module that manages recovery of faults that occur in file system 28. Fault handler 22 may be adapted or otherwise configured to divert control of the recovery process to recovery manager 38 upon determining that the fault originated in file system 28. Recovery manager 38 then orchestrates the recovery of file system 28 in accordance with one or more aspects of the techniques set forth in this disclosure and described in more detail below.

Checkpoint manager 36 and recover manager 38 are aided in their respective operations by a checkpoint agent 46 and a recovery agent 48. Checkpoint agent 46 may represent a shim module placed between VFS 26 and FS 28 so as to monitor and log operations issued by virtual file system 26 to file system 28. Checkpoint agent 46 may also isolate FS 28 from VFS 26 (which may involve halting operations or invocation of file system-specific functions by VFS 26) so that a checkpoint or snapshot may be completed without impacting those operations or the resulting checkpoint or snapshot. Recovery agent 48 represents another shim module placed between VFS 26 and the remaining portions of operating system 14 that, in response to a fault, halts or otherwise stops operations or invocation of VFS functions from reaching VFS 26. By halting these operations, recovery agent 48 may halt these operations to ensure that these operations do not access any corrupt (or inconsistent) file system state data until the recovery is complete. In this sense, recovery agent 48 may isolate file system 28 from operating system 14 and thereby allow for recovery manager 38 to unmount file system 28, remount file system 28 using checkpoint data 40 and restore file system 28 to its previous state using log data 42.

In the example of FIG. 1, both checkpoint manager 36 and recovery manager 38 communicate with both of checkpoint agent 46 and recovery agent 48. In a sense, checkpoint agent 46 and recovery agent 48 may provide an interface by which recovery manager 38 and checkpoint manager 36 may communicate with one another. While described in this manner with respect to the example of FIG. 1, checkpoint manager 36 may instead include an interface separate from checkpoint agent 46 by which recovery manager 38 may communicate with checkpoint manger 36 and, likewise, recovery manager 38 may provide an interface separate from recovery agent 48 by which checkpoint manager 36 may communicate with recovery manager 38. Moreover, checkpoint and recover managers 36, 38 may be implemented as a single restartable file system unit or module that implements the techniques described in this disclosure. In this respect, the techniques should not be limited to the example of FIG. 1 and may be implemented in any number of ways so as to provide for the limited impact restoration of file system 28.

In operation, operating system 14 receives system calls via SCI module 20, one or more of which may involve operations to be performed by file system 28, such as an open system call to open a file stored by file system 28. Assuming for purposes of example that SCI module 20 receives an open system call, SCI module 20 may transmit log data to checkpoint manager 36 informing checkpoint manager 36 of the open system call. As file system 28 executes this open system call, one or more functions provided by VFS 26 may be invoked. VFS 26 may execute these functions by invoking one or more file system-specific functions, which checkpoint agent 46 may monitor and log, passing log data 42 back to checkpoint manager 36. Checkpoint manager 36 may receive a number of other types of log data 42 from, for example, a memory management or allocation module of operating system 14 (not shown in the example of FIG. 1) that maintains system heap 32, file system 28 and page cache 30, which is described in more detail below.

At periodic intervals, checkpoint manager 36 may take a snapshot of file system 28 and store this snapshot as a checkpoint within checkpoint data 40. This snapshot may capture the current state of file system 28, including page cache 30 and any underlying storage devices. As described below in more detail, the checkpoint process may involve a number of techniques to reduce or even eliminate the need to maintain log data 42 in that the checkpoint may make this log data redundant or outdated. After checkpointing in this manner, checkpoint manager 36 typically discards log data 42 and for this reason, log data 42 is referred to as inter-checkpoint log data 42. Checkpoint manager 36 continues to log and checkpoint in the manner described above until fault handler 22 identifies a fault that originated in file system 28.

In response to detecting that a fault originated in file system 28, fault handler 22 redirects control of the recovery process to recovery manager 38. Recovery manager 38 may first isolate file subsystem 14 from operating system 14 (and thereby from applications 18) by instructing recovery agent 48 to block any pending, but not yet started operations, until recovery manager 38 specifies otherwise. Recovery manager 38 may then unwind any operations currently being performed by file system 28 using log data 42. Recovery manager 38 may implement what may be referred to as a skip/trust unwind protocol. This skip/trust unwind protocol skips over file system calls or operations by returning an error code for these operations. When forming log data 42, checkpoint manager 36 may store error codes for each system call that involves the file system. Recovery manager 38 may harvest these error codes from log data 42 and provide these error codes to the calling portion of operating system 14, which in this case may be referred to as the operating system kernel or kernel. The kernel represents, as its name suggests, the core operating system module responsible for the core functionality of operating system 14. The kernel is typically the central module that facilitates interoperability between the peripheral modules of the operating system. The kernel typically includes SCI module 20 to provide an interface with applications 18 and device drivers to interface with the underlying hardware. The kernel also typically includes fault handler 22 and other interrupt and exception mechanisms.

The kernel, in this example, receives the error code and invokes fault handler 22, which handles the call. Fault handler 22 may return control to the function that invoked the function of the kernel, which in some examples may return control back to one or more functions of file system 28. Upon returning control to file system 28, the processor attempts to execute the referenced program code of file system 28 but, because this code has been marked as non-executable as part of initiating the skip/trust unwind protocol as described in more detail below, issues a fault to fault handler 22. By issuing this fault, the processor redirects control back to recovery manager 38 upon determining that the fault originated with file system 28. Recovery manager 38 may skip over the file system functions and return control back to the trusted kernel, again by signaling the corresponding fault stored as log data 42 by checkpoint manager 36. The kernel may again then handle the fault returned by recovery manager 38. In this respect, recovery manager 38 skips untrusted file system functions triggered by the open system call but trusts kernel functions triggered by the open system call. For this reason, the process of unwinding currently executed operations may be referred to as a skip/trust unwind protocol.

While described with respect to two specific portions of operating system 14, i.e., the kernel and file system 28, the unwind techniques described in this disclosure may be implemented with respect to any two intertwined portions of operating system 14. The phrase "intertwined portions" refers to any two software components of the operating system that invoke one another by system calls. In the example above, the kernel includes software functions, e.g., software functions of VFS 26, that make system calls to invoke software functions of file system 28. In turn, program code of file system 28 includes software functions that make system calls to software functions of the kernel, e.g., VFS 26. In this example, the kernel and file system 28 may be considered two intertwined portions of operating system 14. Generally, when executing the first one of the intertwined portions of the operating system, i.e., the kernel in this example, the first one of the intertwined portions invokes the second one of the intertwined portions of the operating system, i.e., file system 28 in this example. Checkpoint manager 36, in response to invoking file system 28, stores data that enables recovery from a failure in executing the file system 28, i.e., log data 42 in this example.

In this sense, upon detecting such a fault, recovery manager 38 may recover from the file system fault based on log data 42 to unwind execution of file system 28, leveraging recovery operations provided by the kernel to unwind execution of the kernel system call. By leveraging these recovery operations, the unwind techniques described in this disclosure effectively trust the kernel to be bug-free and capable of recovery in this instance. While such trust may by unwarranted, by trusting the kernel in this manner, recovery manager 38 may more efficiently and with less complexity recovery file system 28 and checkpoint manager 36 may not be required to perform more extensive inter-checkpoint logging that may reduce performance of computing device 10.

After unwinding active or currently executed operations, recovery manager 38 may unmount file system 28 and remount file system 28 using the most recent checkpoint stored as checkpoint data 40. Recovery manager 38 then reinitiate execution of previously unwound operations based on log data 42 so as to restore the current state of file system 28 before the fault. Recovery manager 38 may orchestrate this recovery process without requiring operating system 14 to be restarted. After restoring this current pre-fault state and upon the successful completion of the reinitiated operations, recovery manager 38 may instruct recovery agent 48 to once again allow pending, but not yet started, operations to reach virtual file system 26 and then file system 28. File system 28 may then return a response to the open system call, i.e., the data from page cache 30 corresponding to the file specified in the open system call, such that the issuing one of applications 18 is unaware of the file system failure or fault.

In this way, control unit 12 executes operating system 14 to provide operating environment 16 in which applications 18 execute, where applications 18 issue one or more requests to access a file stored to file system 28 via system call interface module 20. Operating system 14 then invokes file system 28 to process the request. In processing the request, file system 28 may fail or otherwise fault, resulting in a fault interrupt to fault handler 22. Fault handler 22 may determine that the file system has failed or faulted and pass control to recovery manager 38, which restores file system 28 to a pre-failure state without restarting the operating system. In some instances, recovery manager 38 restores file system 28 to the state it was in when the fault or failure was detected. File system 28 may then return a response to the request such that the application that issued the request is unaware of the failure and successive restore of the file system.

The techniques thereby provide this so-called membrane through the creation of file system checkpoints and inter-checkpoint logs. In response to a file system failure, the techniques effectively isolate the file system by delaying pending, but not yet started, file system processes and halting those file system processes currently being executed. Once halted, the techniques unwind the existing file system processes to effectively remove these current processes by leveraging current fault management aspects of the operating system. After unwinding the processes, the techniques may un-mount the faulted file system, remount the file system from the last file system checkpoint, and rebuild the previous file system state based on the inter-checkpoint logs. Once the file system is rebuilt, the techniques may resume those halted file system processes and begin accepting the pending but not yet started file system processes.

By way of tracking or monitoring various aspects of the virtual file system, the techniques may learn or otherwise determine information about the virtual file system for replay of completed and in-flight operations. i.e., inter-checkpoint logs are replayed through the VFS layer without any support from the underlying file system in the example above. By monitoring the VFS layer, the techniques may provide for a simplified restartable file system. In addition, through isolation of the file system in this manner, the techniques may avoid restarting the operating systems in response to file system failure, which may greatly improve the user experience associated with operating systems that feature these techniques while also promoting more stable and functional operating systems.

Figure 2A:
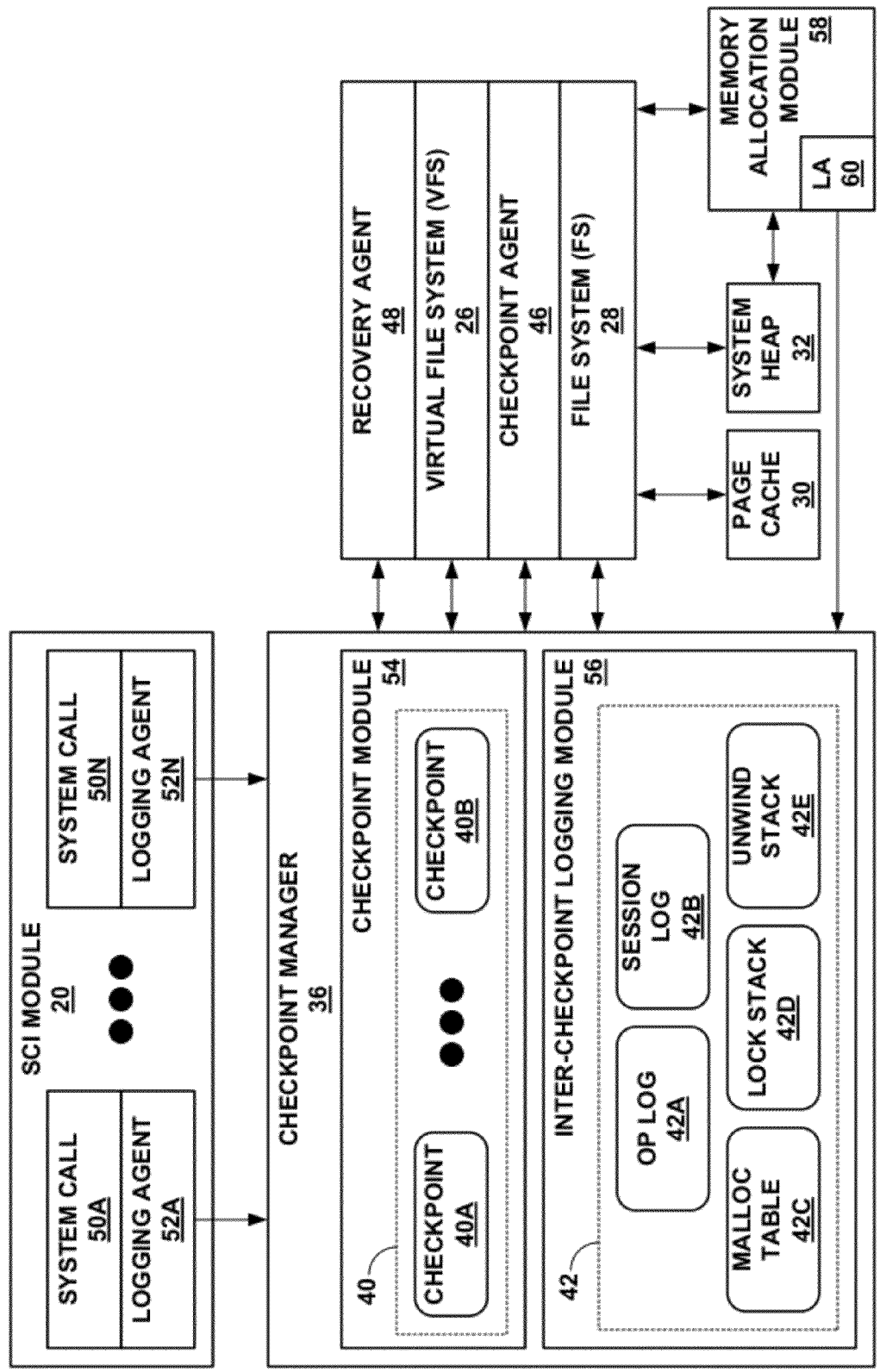
FIGS. 2A, 2B are block diagrams illustrating in more detail various aspects of the operating system shown in the example of FIG. 1.
Figure 2B:
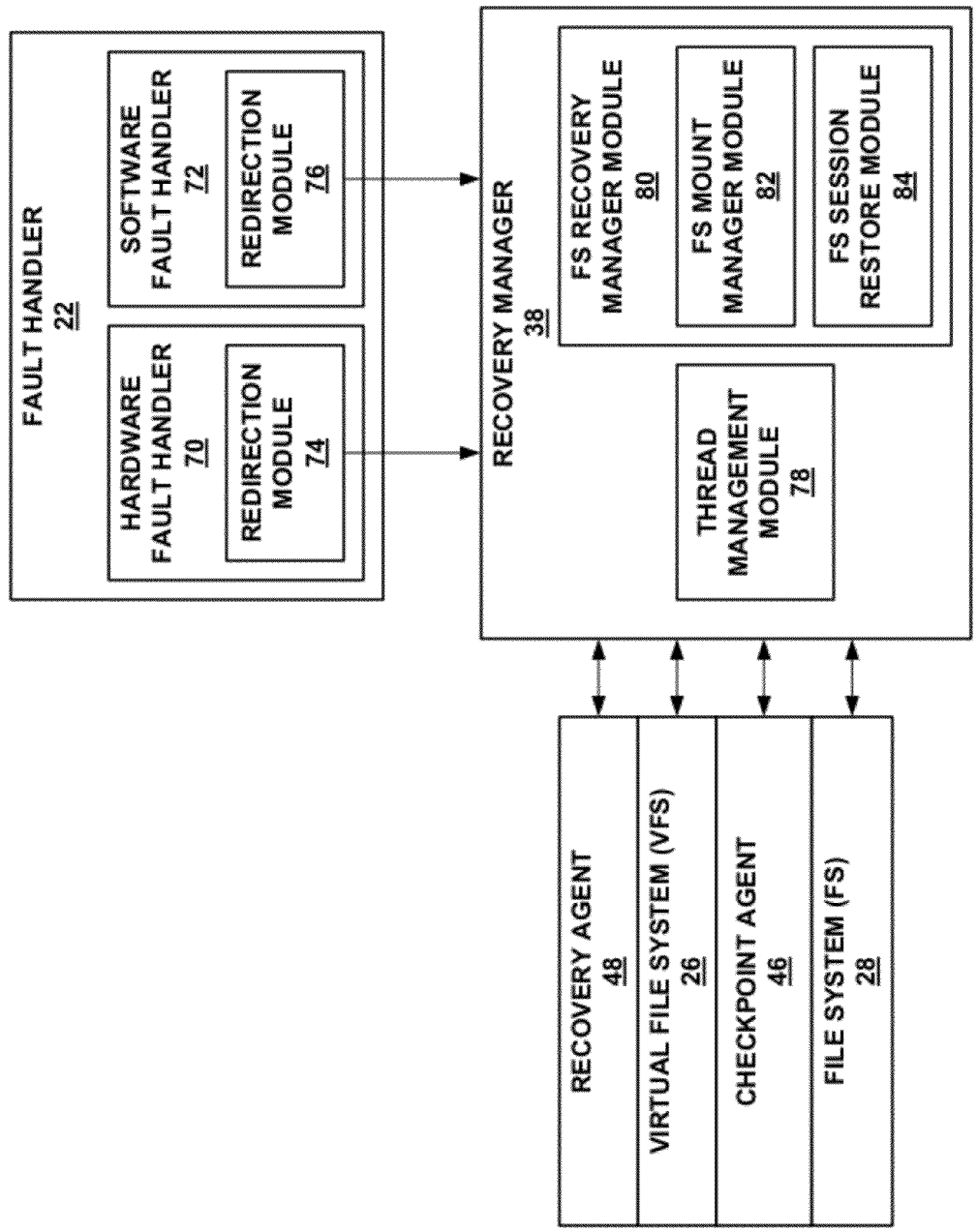

FIGS. 2A, 2B are block diagrams illustrating in more detail various aspects of operating system 14 shown in the example of FIG. 1. FIG. 2A is a block diagram illustrating SCI module 20 and checkpoint manger 36 of operating system 14 in more detail. FIG. 2B is a block diagram illustrating fault handler 22 and recovery manager 38 of operating system 14 in more detail.

Referring first to the example of FIG. 2A, SCI module 20 includes system calls 50A-50N ("system calls 50"), each of which represents a function made available to applications 18. One or more of system calls 50 may be adapted or otherwise configured to include a logging agent 52A-52N ("logging agents 52"). Logging agents 52 may be integrated within one or more function calls of their respective system calls 50 such that when the respective one of system calls 50 are invoked, the corresponding one of logging agents 52 may log file system calls or invocation of virtual file system functions, as well as, information of which of the functions that form the associated one of system calls 50 invoked the file system function.

Checkpoint manager 36 generally provides a form of what may be referred to as fault anticipation that may limit or otherwise minimize overhead while retaining the ability to restore file system 28. Checkpoint manager 36 includes a checkpoint module 54 and an inter-checkpoint logging module 56. Checkpoint module 54 represents a module that performs a lightweight process to checkpoint or, in other words, take a snapshot of file system 28 and stores data regarding this checkpoint as checkpoints 40A-40N ("checkpoints 40"). Checkpoint module 54 partitions file system operations into different epochs (or transactions) and ensures that each of checkpoints 40 represents a consistent state. Each of checkpoints 40A-40N represents a snapshot or checkpoint taken of file system 28 at a different time or during a different epoch. While shown as storing more than one checkpoint 40, checkpoint module 54 may instead store only the most recent one of checkpoints 40 and the techniques should not be limited in this respect to storing more than one checkpoint.

Inter-checkpoint logging module 56 represents a module that performs inter-checkpoint logging to store log data 42. In effect, inter-checkpoint logging module 56 stores data tracking updates to data structures and other state with a set of in-memory logs and stacks. Multiple stacks may be maintained concurrently or in parallel for each process or thread. Log data 42 may comprise a number of different logs 42A-42E in the form of traditional logs, tables, stacks or any other type of data structure or file.

Operation log 42A ("op log 42A") represents a log that stores data recording all state-modifying file system operations (such as an open file system operation) that have taken place between two successive checkpoints. Operation log 42A generally stores enough data to enable full recovery from any given one of checkpoints 40. Session log 42B represents a log that stores data tracking which files are open at the beginning of an epoch triggering a checkpoint and the current position of a file pointer within file system 28, where a pointer refers to a data structure whose value refers directly to another value stored elsewhere in the computer memory using its address. The file pointer is the data structure maintained by the file system whose value refers to the address of the file currently being operating upon by file system 28. Malloc table 42C represents a table that stores data tracking heap-allocated memory used by file system 28 or, more generally, file system 28. File system 28 may utilize system heap 32 for storing dynamically allocated data structures and run-time data used to facilitate the maintenance and storage of state data that defines file system 28. In the C programming language, requests for additional dynamically allocated heap space are issued in the form of "malloc" function calls. Table 42C adopts the term "malloc" to refer to this function and imply that this table tracks requests for dynamically allocated heap memory.

Lock stack 42D represents a stack data structure storing data that tracks file lock acquires and releases within file system 28. A given file system thread executing in file system 28 locks files prior to performing an operation with respect to the locked file to prevent another file system thread from concurrently operating on the same file. Locking files prevent file ownership conflicts that may result in lost data or uncommitted operations. Once a given operation with respect to the locked file is complete, the file system thread that locked the file releases the lock. Lock stack 42D tracks these thread locks and releases in a stack data structure because the exact order of lock acquires and releases may be important to successfully restoring the state of file system 28. Lock stack 42D may comprise one or more lock stacks, where each lock stack is associated with a different thread. Lock stack 42D may therefore include per-thread lock stacks and push lock acquisitions by a thread onto the lock stack associated with that thread and pop lock acquisitions by the thread from the lock stack associated with that thread. Lock stack 42D may track all of the thread locks and releases or only a certain type of locks and releases, such as global locks and releases, as intra-file system locks and releases are cleaned up and/restored/reacquired after restart while operations are replayed from the operation or session log. By storing or otherwise maintaining lock acquisitions in a last-in-first-out (LIFO) order (meaning that the lock stacks are so-called "LIFO" stacks), recovery manager 38 is able to release them in the proper order as required. Unwind stack 42E represents a stack data structure that stores data tracking the execution of code in the file system and kernel. Unwind stack 42E may comprise per-thread unwind stacks similar to the per-thread lock stacks of lock stack 42D, where register state is pushed onto the per-thread unwind stacks when the file system is called on kernel-to-file system calls. Inter-checkpoint logging module 56 records sufficient information to this unwind stack 42E to unwind threads after a failure in file system 28 has been detected in order to enable restoration of file system 28 using the skip/trust unwind protocol.

Generally, log data 42 may be grouped into two distinct groups. Malloc table 42C, lock stack 42D and unwind stack 42e are compensatory in nature as they are used to compensate for actions that have already taken place and should be undone before proceeding with restoration of file system 28. Operation log 42A and session log 42B are restorative in nature and are used by recovery manager 38 to restore the in-memory state of file system 28 before continuing execution after restoration of file system 28.

Also shown in the example of FIG. 2A is memory allocation module 58, which represents another portion or component of operating system 14 generally and, more specifically, the kernel of operating system 14. Memory allocation module 58 represents a module responsible for managing memory and otherwise allocating memory for use by system heap 32.

Memory allocation module 58 may dynamically allocate additional unused portions of memory for use by system heap 32. Memory allocation module 58 may be adapted or otherwise configured to include a logging agent (LA) 60 ("LA 60"), where this logging agent 60 forwards data regarding file system malloc function calls to inter-checkpoint logging module 56 for use in populating malloc table 42C.

In operation, checkpoint manager 36 receives log data 42 from checkpoint agent 46, logging agents 52 and logging agent 60 concerning the current state of file system 28. In response to receiving this log data 42, checkpoint manager 36 invokes inter-checkpoint logging module 56, which populates one or more operation log 42A, session log 42B, malloc table 42C, lock stack 42D and unwind stack 42E with this log data. For example, checkpoint agent 46 generally monitors file system operations and transmits data concerning those operations that update the file system state to inter-checkpoint logging module 56. To minimize the amount of operation log data logged, checkpoint agent 46 may only log data indicating that a write took place with respect to a particular file without logging the actual data written to the file. By only logging that a write took place with respect to a particular file, checkpoint agent 46 may greatly reduce the amount of memory required to store operation log 42A while also reducing overhead associated with maintaining operation log 42A.

Checkpoint agent 46 avoids logging the actual data written by implementing what may be referred to as "page stealing" techniques. Files that have been edited via a write operation are commonly stored in page cache 30 and may only be written to memory periodically. In response to detecting a fault in file system 28, inter-checkpoint logging module 56 may steal these pages storing edited or what is commonly referred to as "dirty" files and write this dirty page to the underlying storage device for later retrieval once file system 28 has been restored. Inter-checkpoint logging module 56 at this point before restoration of file system 28 then updates operation log 42A to identify the location of the dirty page in the underlying persistent storage device for later use in restoring page cache 30 to its current state. By only storing these pages to the persistent storage device in response to a file system fault, inter-checkpoint logging module 56 avoids having to actually log any write data that edits a file, These page stealing techniques also reducing the number of operations that need to be logged to operation log 42A in that inter-checkpoint logging module 56 only need to log the last write operation successfully completed with respect to each file, as the edited file in the dirty page of page cache 30 stores the most recent copy of the data. As a result of implementing these page stealing techniques, inter-checkpoint logging module 56 may potentially avoid storing application data and successive write operations. Checkpoint agent 46 moreover does not need to monitor, log or record read operations as closely as write operations as these read operations will have either been completed or unwound and replayed in response to a fault. Read operations, however, do not modify the file and thus do not need to be replayed or repeated after a checkpoint to advance the file system to its state prior to the fault or failure. Checkpoint agent 46 may monitor these read operations however to determine the current file position after a successful read operation.

Checkpoint agent 46 also monitors and logs all files that are open and the current file position of each file, such as a pointer that points to the last location in a file accessed by one of applications 18. Checkpoint agent 46 logs this data to session log 42B. Logging agent 60 further reports, as noted above, memory allocations performed by file system 28. File system 28 may be adapted or otherwise configured to insert a new allocation flag, which may be denoted as "GFP_FSX_RE-STARTABLE," to all memory allocation calls. Upon receiving a memory allocation call from file system 28 with this new allocation flag, memory allocation module 58 invokes logging agent 60 to record the necessary per-file system information into malloc table 42C.

File system 28 may also be adapted or otherwise configured to track lock acquisitions. In particular, file system 28 may be adapted or configured to track only global locks. Thus, when a thread is running in the file system, the instrumented lock function saves the lock information in the threads's private lock stack 42D for global locks, where the term global locks generally refers to locks that are shared by the file system with the kernel or another software module of, for example, the operating system. Exemplary global locks include a global kernel lock, a super-block lock and an inode lock. File system-specific locks or intra-file system locks may not need to be tracked as these locks will be removed during recovery and appropriately re-instated during replay of the operations from the operation log. Logging agents 52 also logs all kernel calls into the file system. Typically, logging agents 52 are implemented as wrappers that push and pop register state, return addresses and return values (such as the above noted error codes) onto and off of unwind stack 42E. Logging agents 52 push this log data 42 onto unwind stack 42E at the beginning of the kernel call and pop this log data 42 if the kernel call completes successfully. In this way, inter-checkpoint logging module 56 along with checkpoint agent 46, logging agents 52, logging agent 60 and file system 28 store log data 42 to both unwind inter-checkpoint operations and then restore file system 28 to its state immediately before the occurrence of the fault.

At periodic intervals, checkpoint manager 36 takes a snapshot or checkpoints file system 28. To take this snapshot, checkpoint manager 36 invokes checkpoint module 54. Checkpoint module 54 performs a form of copy-on-write (COW) based checkpointing. Checkpointing is generally necessary to provide a restartable file system because file system state is constantly modified by operations such as writes and deletes. The file system lazily writes back the modified state to improve performance (e.g., by only writing back changed state data when the operating system is relatively inactive). As any point in time then, file system 28 may be comprised of dirty pages in memory, in-memory copies of its meta data objects (that have not yet been copied to its on-disk pages) and data on the disk. Thus, the file system is typically in an inconsistent state until all of the dirty pages and meta-data objects are stored to the disk. To provide correct operation and permit restoration, checkpoint module 54 may need to ensure that the file system is in a consistent state at the beginning of the mount or, in the case of restartable file system 28, restoration processes.

While the techniques described in this disclosure provide for a light-weight form of checkpointing optimized to facilitate the logical creation of a membrane, other checkpointing or snapshot mechanisms provided by file systems may be employed as an alternative to or in conjunction with the COW-based checkpointing implemented in accordance with the techniques described in this disclosure. That is, file system 28 may provide a snapshot or checkpointing function that checkpoint module 54 may invoke to create checkpoints 40. However, for file systems that do not support snapshots or checkpointing, checkpoint module 54 may invoke checkpoint agent 46 to create checkpoints 40. To create checkpoints 40, checkpoint agent 46 may group several file system operations into a single transaction and commit this transaction to the disk. Prior to creating this transaction, checkpoint manager 36, in some instances, interfaces with a session manager of operating system 14 (which is not shown in FIGS. 2A, 2B for ease of illustration purposes) instructing this session manager to halt all file system operations for a relatively small duration after waiting for all in-process operations to complete. During this duration and once the session manager signals that all in-process operations have been completed, checkpoint agent 46 copies dirty meta-data objects back to their on-disk pages and all dirty pages are marked copy-on-write (COW). Instead, Checkpoint agent 46 associates each page with one of checkpoint number associated with the most recent one of checkpoints 40 to prevent pages dirtied in the current epoch from reaching the disk.

By using this COW support of file system 28, checkpoint agent 46 improves performance in performing checkpointing by allowing file system operations to run concurrently with the checkpoint of the previous epoch. That is, forcing all dirty pages to be written to disk immediately rather than leverage the COW support of file system 28 would be slow and basically extend the duration during which new operations are not able to enter file system 28. Once these pages have been marked COW, checkpoint agent 46 returns one of checkpoints 40, which may indicate which pages were marked COW and their location in memory. Checkpoint module 54 then interfaces with the session manager and instructs the session manager to allow file system operations to once again flow to file system 28. If these new operations attempt to write to these COW-marked pages, a COW fault results and fault handler 22 copies the desired COW marked pages and indicates that the data is to be written to the copy of the COW marked page. Many operating systems support COW to enable (among other things) fast address-space copying during process creation. If not implemented for particular types of pages, such as kernel pages, checkpoint agent 46 may provide COW support to avoid having to alter file systems to support COW. Using the checkpoint number associated with each page, checkpoint module 54 allows these pages to be written to disk and the background input/output (I/O) process or daemon (e.g., pdflush in the example of the Linux operating system) is free to write COW pages to disk during the next epoch. Checkpoint module 54, working with checkpoint agent 46, thereby groups dirty pages from the previous epoch and may only allow modifications to be written to disk during the next epoch, where newly dirtied pages are held in memory until the complete flush of the previous epoch's dirty pages.

Checkpoint module 54 may perform checkpointing in accordance with a user configured policy or in response to dynamically monitoring any number of factors. Likely factors that may affect when checkpointing is performed may include the time that has elapsed since the lask checkpoint (to minimize recover time), the number of dirty blocks (to keep memory pressure low) and the current levels of processor and/or I/O utilization (to perform checkpointing during relatively idle times). Alternatively, checkpointing may be performed periodically, such as every five seconds. Checkpointing may also be initiated any time one of applications 18 forces data to a storage drive.

Referring next to the example of FIG. 2B, fault handler 22 performs a form of what may be referred to as fault detection. Fault handler 22 performs a lightweight form of fault detection that involves catching as many faults as possible without overly inserting implementation complexity that may reduce execution efficiency and introduce delay. Fault handler 22 includes a hardware fault handler 70 and a software fault handler 72. Hardware fault handler 70 represents a module responsible for handling hardware-based faults while software fault handler 72 represents a module responsible for handling software-based faults. Software fault handler module 72 may include one or more of extensible programmer defined software assertions and checks to determine that the code segment has faulted. Hardware fault handler 70 detects hardware faults, such as null pointer faults, divide-by-zero faults, as well as any other hardware exception commonly triggered by hardware, such as arithmetic logic units, interfaces, graphical processing units, central processing units and the like. Hardware fault handler 70 includes a redirection module 74 that detects when hardware faults occur in the context of a file system operation. While shown as a single module, fault handler 22 including hardware and software fault modules 70, 72 may be distributed throughout various modules of the operating system to detect software or hardware faults.

Redirection module 74 represents a module that redirects handling of these file system hardware faults to recovery manager 38. Software fault hander 72 handles software faults such as file system fault assertions as well as invocation of the panic and similar functions. Software fault handler 72 includes a redirection module 76, which may be distributed throughout software fault handler 72. Redirection module 76 may detect when a software fault occurs in the context of file system 28 and redirects handling of these faults, many of which may commonly require a restart of operating system 14 to overcome, to recovery manager 38.

File system 28 may further be adapted or otherwise configured to perform explicit error checks to detect a broader class of semantically-meaningful faults and route handling of these faults not to fault handler 22 but directly to recovery manager 38. These error checks may be located in the interface presented by file system 28 to the kernel or, in some instances, between virtual file system 26 and the kernel in the form of recovery agent 48. Recovery agent 48 may initiate this error checking to prevent fault propagation in to the kernel proper such that they are handled by fault hander 22 rather than recovery manager 38. While shown as being located as on top of virtual file system 26, this error checking aspect of recovery agent 48 may be integrated in any number of portions of operating system 14 generally and the kernel, more specifically. For example, these error checks may be inserted across key points in the generic file system and memory management modules as well as in header files.

Also as shown in the example of FIG. 2B, recovery manager 38 includes a thread management module 78 and a file system (FS) recovery management module 80 ("FS recovery manager module 80"). Recovery manager 38 implements a form of what may be referred to as fault recovery, which is invoked when a fault is detected either by fault handler 22 through its redirection modules 74 and 76 or directly by file system 28. Thread management module 78 represent a module that unwinds in-process file system threads and prevents pending file system threads from being executed. To capture control of these threads that need to be unwound, thread management module 78 marks all code pages of file system 28 as non-executable, thereby ensnaring other threads with a technique that may be referred to as control-flow capture. When a file system thread is being executed after being marked as non-executable, the hardware generates a trap, which is directed to hardware fault handler 70 of fault handler 22. Redirection module 74 of hardware fault handler 70 then hands control to recovery manager 38. Recovery manger 38 invokes thread management module 78, which proceed to unwind the threads in accordance with the skip/trust unwind protocol mentioned above.

Thread management module 78 implements the above noted skip/trust unwind protocol. This protocol skips over file system code but trusts the kernel code to behave reasonably in response to a failure and thus manage kernel state correctly. Thread management module 78 coerces such behavior from the kernel by carefully arranging the return values (which are more than likely error codes) on the stack, mimicking an error return from a failed file system thread or routine to the kernel. Thread management module 78 permits the kernel code to run and clean up its state in response to the error code. Thread management module 78 interfaces with checkpoint agent 46 to retrieve unwind stack 42E, which provides the necessary information or data to unwind an associated process. Unwind stack 42E may store register values (some of which may specify an error) and the last kernel function preceding the faulted file system process or thread. Thread management module 78 unwinds this process by replacing the current register values with the register values from unwind stack 42E and mimics a returns back to the identified last kernel functions.

While described herein as interfacing with checkpoint agent 46 to retrieve unwind stack 42E, unwind stack 42E and any other portion of log data 42 may be stored generally by operating system 14. For example, in the case of unwind stack 42E, operating system 14 may store this stack 42E in what may be referred to as a process task structure or, in other words, meta-data maintained by operating system 14 for this particular process that is to be unwound. Thus, while generally shown as being stored and otherwise maintained by checkpoint manager 36, implementations may vary, especially with respect to the operating system in which these techniques are implemented. Consequently, the techniques should not be limited in this respect to the examples shown in FIG. 2A.

FS recovery manager module 80 represents a module that manages recovery of file system 28. FS recovery manager module 80 includes a FS mount manager module 82 and a FS session restore module 84. FS mount manager module 82 represents a module that unmounts faulted file system 28 and remounts file system 28 from persistent storage devices. FS mount manager module 82 may also represent a module that commits dirty pages from previous epochs, as identified by the most recent one of checkpoints 40 to stable or persistent storage devices. FS mount manager module 82 forcefully commits these dirty pages to disk or other persistent storage devices. FS mount manager module 82 further interfaces with checkpoint agent 46 to retrieve malloc table 42C and, based on malloc table 42C, free all in-memory objects allocated by file system 28. FS mount manager module 82 may further unmount file system 28 by freeing all items or elements in the file system buffer cache (e.g., inodes and directory entries). FS mount manager module 82 also effectively releases all pages for this file system 28 in page cache 30. FS mount manager module 82 then remounts file system 28 by reading the super block of the file system from stable storage and performing all other tasks to reattach file system 28 to operating system 14.

FS session restore module 84 represents a module that restores file system to the state it was at when the fault occurred. FS session restore module 84 interfaces with checkpoint agent 46 to retrieve session log 42B and uses this session log 42B to restore the sessions of active processes to the state of file system 28 when the last one of checkpoints 40 was captured. FS session restore module 84 also interfaces with checkpoint agent 46 to retrieve operation log 42A and uses operation log 42A to replay previous operations as needed so as to restore the active state of file system 28 to its state when the fault occurred. FS session restore module 84 may interface with recovery agent 48 to replay these operations such that these operations seem to come from one or more of application 18 rather than recovery manager 38. After these operations have completed successfully, FS session restore module 84 restarts execution of pending, but not yet executed, threads, such as those threads that were "in flight" at the time of the fault. The restoration of file system 28 may from the perspective of these threads occur transparently given that these threads are unaware of the restoration of file system 28.

In some instances, the order of the operations in operation log 42A need not be the same as the order executed by the scheduler of operating system 14 prior to the fault. Yet, this new execution order could potentially pose a problem while replaying completed write operations as applications 18 could have observed the modified state (via a read operation) before the crash. Recovery manager 38 avoids this non-deterministic replay of completed write operations through page stealing. While replaying completed operations, FS recovery manager module 80 reads the final version of the page from the page cache and re-executes the write operation by copying the data from it. As a result, write operations while being replayed end up being the same final version no matter what order they are executed. Moreover, as the in-flight operations have not yet returned back to the application, FS recovery manager module 80 allows the operating system scheduler to execute them in arbitrary order.

Figure 3:
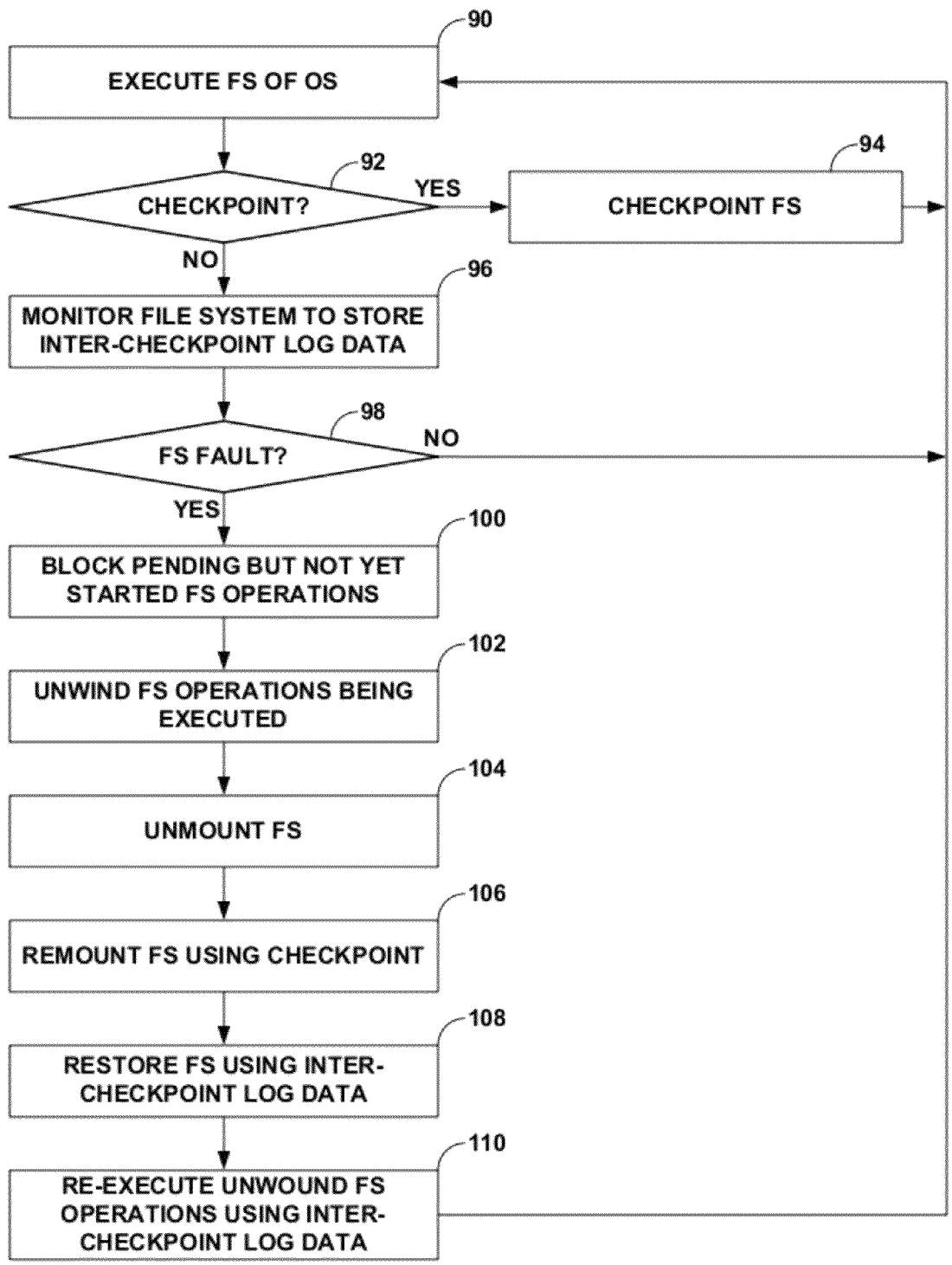
FIG. 3 is a flowchart illustrating exemplary operation of a computing device in implementing the restartable file system techniques described in this disclosure.

FIG. 3 is a flowchart illustrating exemplary operation of a computing device, such as computing device 10 shown in the example of FIG. 1, in implementing the restartable file system techniques described in this disclosure. Initially, control unit 12 of computing device 10 executes operating system 14 and thereby executes file system 28 of operating system 14 (90). Periodically, checkpoint manager 36 may invoke checkpoint module 54 to perform a checkpoint based on the factors described above (92). If checkpoint manager 36 determines based on these factors to perform a checkpoint ("YES" 92), checkpoint manager 36 invokes checkpoint module 54, which checkpoints file system 28 in the manner set forth above (94). If checkpoint manager 36 determines based on these factors that a checkpoint should not be performed ("NO" 92), checkpoint manager 36 interfaces with checkpoint agent 46, logging agents 52 and logging agent 60 to monitor file system 28 and store inter-checkpoint log data 42 (96). In particular, checkpoint manager 36 invokes inter-checkpoint logging module 56, which interfaces with checkpoint agent 46, logging agents 52A and logging agents 60 to collect log data 42. Inter-checkpoint logging module 56 stores log data 42 to operation log 42A, session log 42B, malloc table 42C, lock stack 42D and unwind stack 42E, as described above.

Meanwhile, fault handler 22 may receive faults and determine whether these faults occur in the context of file system 28 (e.g., by examining the code segment that faulted and determine that this fault occurred in the context of the file system for which membrane protection is provided), as described above in more detail (98). If a file system fault is not detected ("NO" 98), file handler 22 handles the fault in accordance with conventional fault handling techniques. In these no file system fault instances, control unit 12 continues to execute file system 28 of operating system 14, where checkpoint manager 36 continues to perform checkpoints and inter-checkpoint logging (90-96).

However, if a file system fault is detected ("YES" 98), fault handler 22 invokes one of redirection modules 74, 76 to redirect control or handling of the file system fault to recovery manager 38. Recovery manage 38 interfaces with recovery agent 48 instructing recovery agent 48 to block pending but not yet started FS operations (100). Recovery manager 38 then invokes thread management module 78. Thread management module 78 unwinds those FS operations in the process of being executed by file system 28 when the fault occurred in accordance with the skip/trust unwind protocol described above (102). Once these operations are unwound, recovery manager 38 invokes FS recovery manager module 80, which in turn invokes FS mount manager module 82. FS mount manager module 82 unmounts file system 28 and remounts file system 28 using the last one of checkpoints 40, as described above (104, 106). FS recovery manager module 80 then invokes FS session restore module 84. FS session restore module 84 restores file system 28 using inter-checkpoint log data 42 in the manner described above (108). Also as described above, FS session restore module 84 also re-executes unwound FS operations using inter-checkpoint log data 42 (110).

Once these unwound FS operations have been completed successfully, recovery manager 38 may interface with recovery agent 48 to once again allow file system 28 to receive and process pending, but not yet started, file system operations, where control unit 12 may once again resume normal execution of file system 28 of operating system 14 (90). The entire file system restoration process does not normally require a restart of operating system 14 as a result of the careful logging and restore operations performed by checkpoint manager 36 and recovery manager 38, respectively. As a result, normal execution of operating system 14 may resume such that applications 18 are unaware of the file system failure or fault. Consequently, operating system 14 may continue to execute and the file system restoration processes may continue to perform checkpoints and inter-checkpoint logging while also seamlessly recovering from file system faults without overly impacting execution of applications 18 (90-110).

In some instances, recovery manager 38 may determine that the file system function failures and subsequent restoration of the file system to the software application are repeating, which is indicative of a non-transient fault. Recovery manager 38 may then halt recovery and return an error to the software application indicating a non-transient failure. In this way, recovery manager 38 does not endlessly loop attempting to recover from a non-transient, unrecoverable error.

Figure 4:
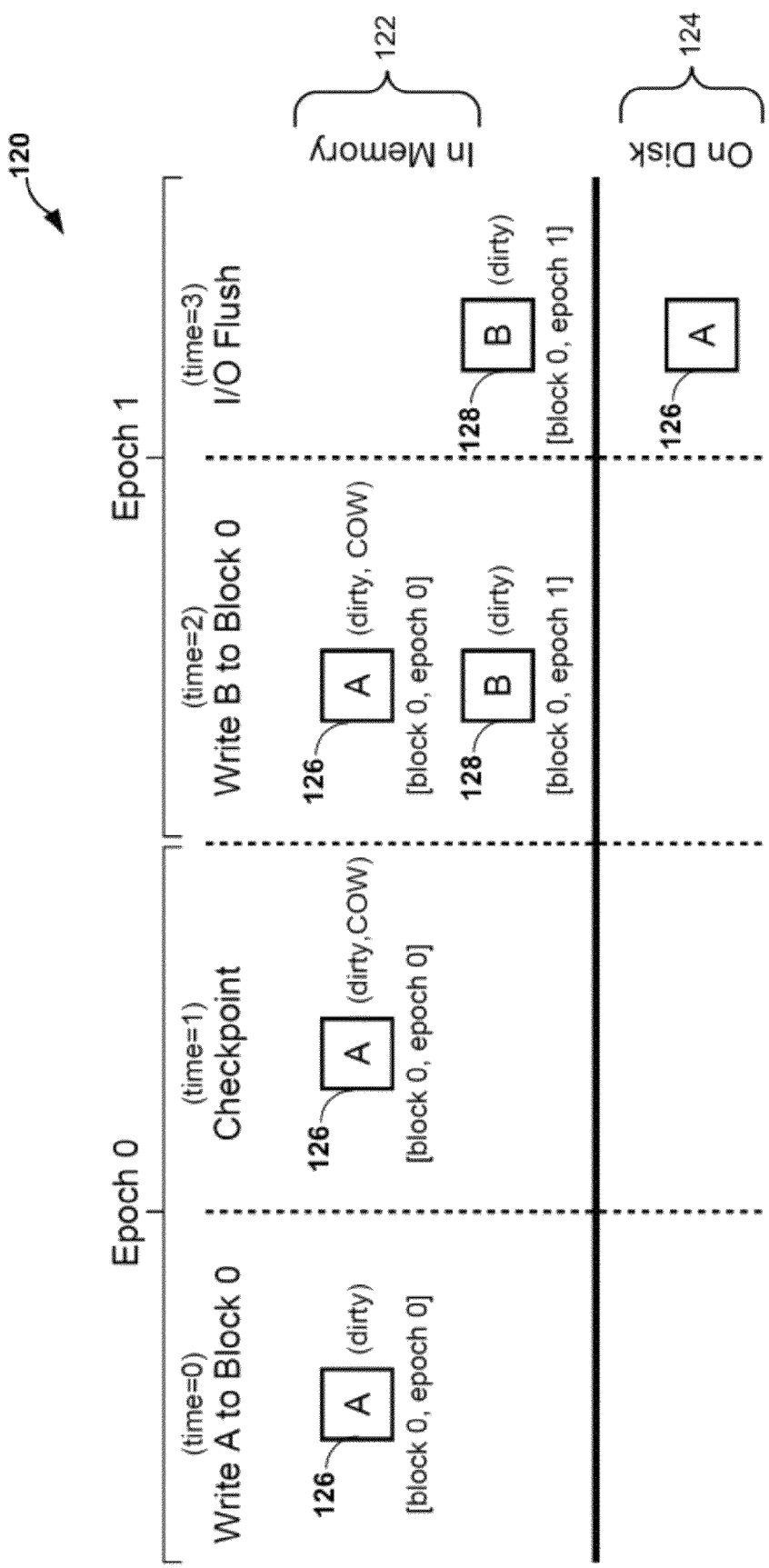
FIG. 4 is a diagram illustrating a timing graph detailing operating of an operating system in performing the copy-on-write checkpointing aspects of the restartable file system techniques described in this disclosure.

FIG. 4 is a diagram illustrating a timing graph 120 detailing operating of an operating system, such as operating system 14 shown in the example of FIG. 1, in performing the copy-on-write checkpointing aspects of the restartable file system techniques described in this disclosure. In the example of FIG. 4, the top portion of scenario 120 segments control unit 12 into data that is stored in memory, which is denoted as "in-memory 122," and data that is stored to persistent storage devices, which is denoted as "on disk 124." Moving along the x-axis of timing graph 120 time increases from "time=0" to "time=3," where time equals zero refers to a first clock cycle and time equals three refers to a fourth clock cycle. In the example of FIG. 4, the first and second clock cycles form a first epoch denoted as "epoch 0," while clock cycles three and four form a second epoch denoted as "epoch 1."

During this first clock cycle ("time=0" in the example of FIG. 4), one of system calls 50 (shown in the example of FIG. 2B) are invoked to write "A" to block 0 of a file, creating a dirty block 126 storing A during epoch 0. During the second clock cycle or "time=1," checkpoint manager 36, which may represent a background process, wakes up and invokes checkpoint module 54. Checkpoint module 54 interfaces with checkpoint agent 46 in the manner described above to mark all dirty pages as copy-on-write (COW). In the example of FIG. 4, dirty block 126 is marked as COW in the second clock cycle.

After checkpointing in this manner and during the third clock cycle (or "time=2"), another one of system calls 50 is invoked to write B to block 0. However, this system call process or thread (which may be used interchangeably when a process only includes a single thread), when attempting to write B to block 0, raises a fault, given that this dirty block 126 has been marked COW. Fault handler 22 processes this fault and, in response, creates a copy of dirty block 126, passing this copied block 128 back to the system call process. The system call process then writes B to this copy of block zero or copied block 128. At this point, both dirty block 126 and copied block 128 are stored in memory. During the fourth clock cycle (or "time=3"), file system 28 performs an input/output (I/O) flush to flush all dirty pages associated with the previous epoch, i.e., epoch 0 in this example, back to disk 124. As a result, dirty block 126 is stored back to disk. However, all dirty blocks associated with the current epoch, i.e., epoch 1 in this example, remain in memory 122. In this way, the techniques of this disclosure provide for a COW-based form of checkpointing that may potentially reducing overhead associated with performing checkpointing by delaying writes to disk of pages dirtied during a first epoch until a subsequent second epoch.

Figure 5:
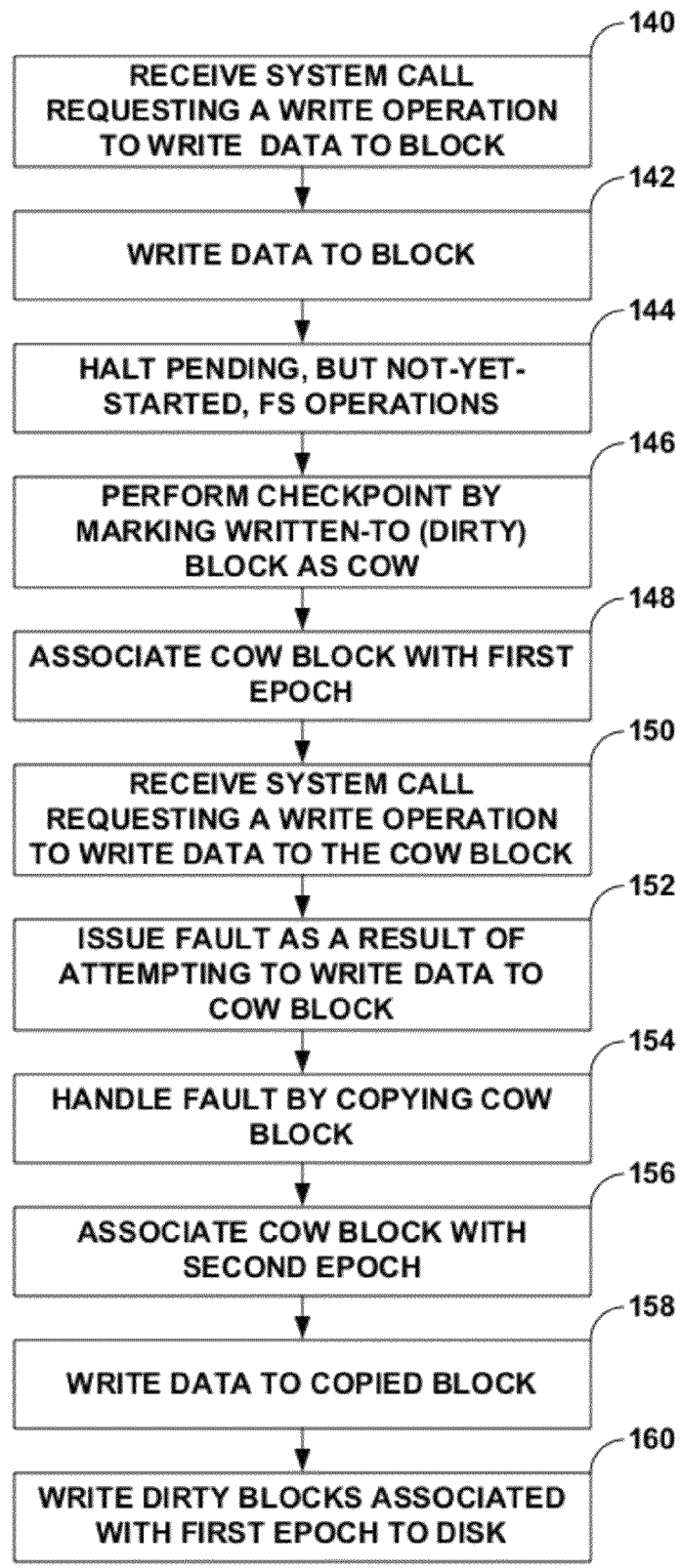
FIG. 5 is a flowchart illustrating exemplary operation of an operating system in implementing the COW-based checkpointing aspects of the file system restoration techniques described in this disclosure.

FIG. 5 is a flowchart illustrating exemplary operation of an operating system, such as operating system 14, in implementing the COW-based checkpointing aspects of the file system restoration techniques described in this disclosure. Initially, operating system 14 receives an invocation of one of system calls 50 requesting a write operation to write data to a block, such as block 126 shown in the example of FIG. 4 (140). Operating system 14 then invokes the write operation of VFS 26, which translates this write operation into a file specific write operation specific to file system 28. File system 28 then proceeds to write the data to block 126 (142).

At some point, checkpoint manager 36 wakes up or otherwise triggers a checkpoint, whereupon checkpoint manger 36 interfaces with the session manager of operating system 14 to halt pending, but not-yet-started, file system operations (144). Checkpoint manager 36 then performs the checkpoint by interfacing with checkpoint agent 46 to mark written-to or dirty blocks, e.g., dirty block 126, as COW (146). Checkpoint agent 46 may return data identifying which blocks were marked COW to checkpoint module 54, which stores these blocks along with the current epoch identifier or number identifying the current epoch as one of checkpoints 40 (146, 148). Checkpoint module 56 may interface with the session manager to resume execution of pending, but not-yet-started, file system operations.

Operating system 14 may once again receive an invocation of one of system calls 50 requesting that data being written to the previously marked COW block, e.g., block 126. When file system 28 attempts to write to this COW block, file system 28 throws a fault given that this block is marked COW (152). Fault handler 22 handles this fault by copying COW block to generate a copied block, such as copied block 128 shown in the example of FIG. 4. Checkpoint agent 46 associates this copied block 128 with the subsequent second epoch and passes this data back to checkpoint module 54, which stores this data to another one of checkpoints 40. File system 28 then writes the data to copied block 128, which has not been marked COW (158). At some later point, such as during a period of relative inactivity of the second epoch, checkpoint module 56 causes file system 28 to write dirty blocks associated with the first epoch, e.g., block 126, to disk (160), thereby maintaining a consistent file system image or checkpoint in a lazy manner that does not require immediate storage of dirty pages at the end of the first epoch.

Figure 6:
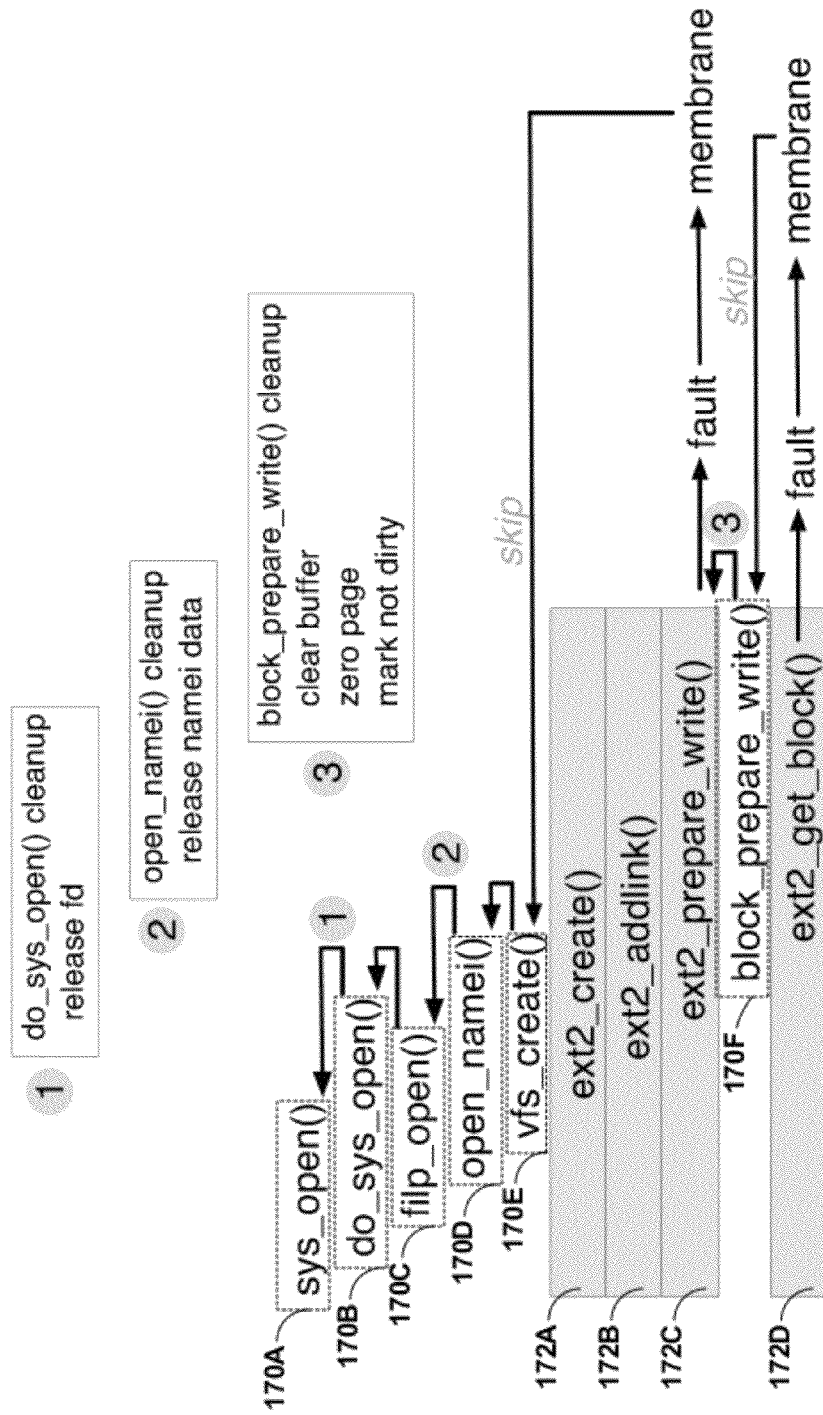
FIG. 6 is a diagram illustrating example operation of an operating system in implementing the skip/trust unwind protocol in accordance with the file system restoration techniques described in this disclosure.

FIG. 6 is a diagram illustrating example operation of an operating system, such as operating system 14 of FIG. 1, in implementing the skip/trust unwind protocol in accordance with the file system restoration techniques described in this disclosure. In the example of FIG. 6, a number of kernel functions 170A-170F ("kernel functions 170") are shown, where kernel function 170A may represent a kernel function that is made available to applications 18 in the form of one of system functions 50 shown in the example of FIG. 2B. Kernel calls 170B-170F may be private kernel functions that are not publically accessible by applications 18. Also shown in the example of FIG. 6 are a number of file system function 172A-172D ("file system function calls 172").

Initially, kernel function 172A is invoked or called, which invokes or calls kernel function 172B. Kernel function 172B invokes kernel function 170C, which in turn invokes kernel function 170D. Kernel function 170D invokes kernel function 170E, which invokes file system function 172A. At this point between kernel function 170E invoking file system function 172A, membrane 34 as implemented by inter-checkpoint logging module 56 working with checkpoint agent 46 may update log data 42 to update the per-thread unwind stack shown in the example of FIG. 2A as unwind stack 42E in the manner described above. Meanwhile, file system function 172A invokes file system function 172B, which in turn invokes file system function 172C. File system function 172C then invokes kernel function 170F, which invokes file system function 172D. Again, at this point between kernel function 170F invoking file system function 172D, membrane 34 as implemented by inter-checkpoint logging module 56 working with checkpoint agent 46 may update log data 42 to update the per-thread unwind stack shown in the example of FIG. 2A as unwind stack 42E in the manner described above.

As shown in the example of FIG. 6, file system function 172D faults, where control eventually is handed over to recovery system 38. Recovery system 38 invokes thread management module 78 (FIG. 2B), which proceeds to implement the skip/trust unwind protocol using the data stored to per-thread unwind stack 42E. Thread management module 78 pops the first entry from unwind stack 42E pushed on by inter-checkpoint logging module 56, returning the return value logged to the identified function, i.e., kernel function 170F. Kernel function 170F receives this return value, which is more than likely an error value specifically chosen by inter-checkpoint logging module 56 to cause kernel function 170F to perform the operations denoted by the number 3 in a grey circle shown to the right and above kernel functions 170 and file system functions 172. That is, kernel function 170F cleans up by clearing the buffer, zero the page operating on by this kernel function 170F and mark the page as clean or not dirty. Kernel function 170F then passes control to file system function 172C.

Membrane 34 as implemented by recovery manager 38 then catches the attempt to execute file system function 172C, e.g., by previously marking all file system executable or code pages as non-executable, which triggers a fault that fault handler 22 handles by redirecting handling back to thread management module 78). Thread management module 78 then retrieves or otherwise pops the next entry to unwind stack 42E, replaces the current register values with those stored to the popped entry and returns the return value specified by that entry back to kernel function 170E, skipping file system functions 172B and 172A, but trusting kernel function 170E to properly handle the returned fault. Kernel function 170E returns control to kernel function 170D, which implements the cleanup operations shown in the circle denoted as "2." Kernel functions 170D returns control to kernel function 170C, which returns control to kernel function 170B. Kernel function 170B performs the cleanup operations shown next to the circle denoted "1" and returns control to kernel function 170A. In this manner, thread management module 78 implements the skip/trust thread unwind protocol.

As noted above, the kernel and the file system may be considered intertwined portions of an operating system. Intertwined portions arise when a function of one intertwined portion calls a function of the other intertwined portion of the operating system. Rather than attempt to provide a recovery function for each file system function, the skip/trust unwind protocol implemented in accordance with the techniques of this disclosure skips intertwined file system functions and returns control to the trusted kernel functions, which then perform kernel level cleanup. This cleanup is trusted to adequately handle the kernel state and unwind the thread. In this manner, only function calls from the kernel to the file system may need to be logged as compared to also including calls from the kernel to the file system, which may greatly reduce the size of unwind stack 42E, while also reducing the implementation complexity of thread management module 78 in that it potentially does not need to implement a recovery function for each file system operation.

Figure 7:
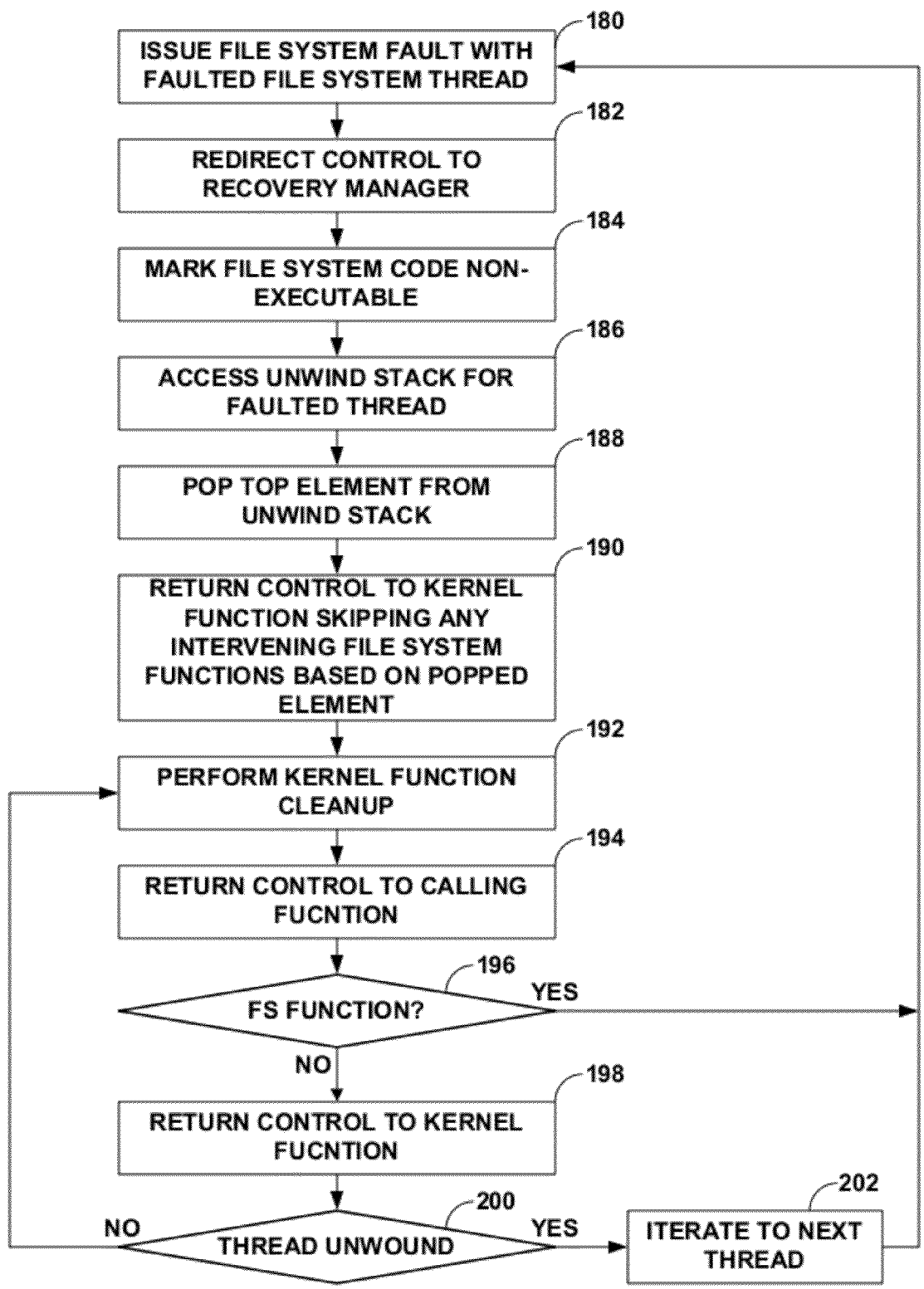
FIG. 7 is a flowchart illustrating example operation of an operating system in implementing the skip-trust unwind protocol aspects of the file system restoration techniques described in this disclosure.

FIG. 7 is a flowchart illustrating example operation of an operating system, such as operating system 14, in implementing the skip-trust unwind protocol aspects of the file system restoration techniques described in this disclosure. Initially, operating system 14 executes file system operations that are initiated, as one example, by invoking one of system functions or calls 50. In the example of FIG. 6, a "sys open" kernel function 170A is invoked, which may represent one of system calls 50. This function 170A may invoke kernel functions 170B-170E, where function 170E invokes file system function 172A. File system function 172A may lead to the invocation of functions 172B-172C, where function 172C may invoke kernel function 170F, which in turn invokes file system function 172D.

File system function 172D, which may also be considered a thread in that when executed functions are normally executed as threads, may fail and, as a result, issue a file system fault (180). Fault handler 22 may handle this fault and redirect this fault to recovery manager 38 (182), which in turn invokes thread management module 78 to unwind this thread and any other threads currently in-flight or in the process of being executed when the fault occurs. Thread management module 78 first marks all executable file system code as non-executable to as to provide flow-control capture in the manner described above (184). Thread management module 78 then interfaces with checkpoint agent 46 to retrieve unwind stack 42E that stores an unwind stack for the faulted thread (186). Thread management module 78 pops the top element from this unwind stack 42E and returns control to the kernel function that invoke or lead to the invocation of the faulted thread skipping any intervening file system functions based on the popped element in the manner described above (188, 190).

Upon receiving control, the kernel function, such as kernel function 170F, performs kernel function cleanup and returns control to the function that called kernel function 170F, e.g., file system function 172C in the example of FIG. 6 (192, 194). If this function is a file system function ("YES" 196), upon attempting to execute this function, a file system fault is issued, as described above (180). The process then repeats, although thread management module 78 may not remark the file system code as non-executable considering that it has already been marked as non-executable (182, 186-196). If the calling function is a kernel function ("NO" 196), control is transferred to this calling function (198). If this is the topmost function, e.g., kernel function 170A, then thread management module 78 determines that the thread has been unwound ("YES" 200) and thread management module 78 may iterate to the next thread and begin unwinding this thread in accordance with skip/trust unwind protocol (202, 180-200). If this is not the top-most thread, the kernel function, e.g., kernel function 170E, performs kernel function cleanup and returns control to its calling function. This process repeats until the thread is unwound or an attempt to execute a file system function occurs (192-200).

FIGS. 8A-8I are block diagrams illustrating exemplary operation of an operating system, such as operating system 14 shown in the example of FIGS. 1, 2A and 2B, in implementing various aspects of the file system restoration techniques described in this disclosure. Referring first to the example of FIG. 8A, one of application 18, i.e., application 18A, issues an request to perform some operation with respect to file system 28 via a system call 50A, which is not explicitly shown in the example of FIG. 8A. Virtual file system 26 receives this request and forwards the file system-specific request to file system 28. File system 28 processes the request, potentially loading one or more of pages 210A-210D from disk 212, which represents an example of a persistent storage device included within computing device 10, into page cache 30. In the example of FIG. 8A, and for that matter, FIGS. 8B-8J, the operating system space or execution environment is labeled as "kernel space" while the application environment is labeled as user space. When application 18A interfaces with kernel space it may only do so via system calls 50 due to the differences in privileges assigned to applications generally, and application 18A in this example, and the kernel or other operating system modules.

At some point, checkpoint module 56 of operating system 14 shown in the example of FIG. 2A interfaces with either the session manager or checkpoint agent 46 to halt or otherwise stop processes from entering file system 28. Checkpoint agent 46 then checkpoints file system 28 and, in the process of checkpointing, marks all of pages 210A-210D as COW. That these pages 210A-210D have been marked COW is reflected by the black coloring of these pages 210A-210D as shown in the example of FIG. 8B. Referring to the example of FIG. 8C, checkpoint module 56 has finished checkpointing as evidenced by the lack of a dashed box surrounding page cache 30 and disk 212 and threads or processes have been allowed to reenter file system 28. Application 18A has, after this checkpoint, requested that another file system operation be performed, which file system 28 performed. This operation involved file system 28 copying another page 210E from disk 212 to page cache 30.

Referring to the example of FIG. 8D, pages 210A-210D are associated with the first epoch that led to the previous checkpoint shown by way of the dashed lined box in FIGS. 8A, 8B. These pages 210A-210D can be written to disk at any point during the current second epoch, and are marked with a checkmark in the example of FIG. 8D to denote that these are available to be written to disk 212. Referring next to FIG. 8E, application 18A issued yet another request for a file system operation that writes data to page 210A. However, this page 210A has been marked as copy-on-write or COW and the attempt by file system 28 to perform this operation results in a fault that fault handler 22 handles by creating a copy of page 210A, which is shown in the example of FIG. 8E as page 210A'. File system 28 then writes the data to page 210A'.

Referring next to the example of FIG. 8F, checkpoint module 56 wakes up and performs another checkpoint as shown in the example of FIG. 8F as the dashed-lined box around page cache 30 and disk 212. Checkpoint module 56 interfaces with checkpoint agent 46 to block access by pending, but not-yet-started, file system processes or threads to file system 28 while also stopping those pages associated with the current epoch, i.e., pages 210A' and 210E in the current example, from being written to disk 212. Checkpoint agent 46, however, does write any of pages 210A-210D that remain in page cache 30 to disk 212. In this respect, the barrier between page cache 30 and disk 212 is permeable with respect to pages associated with the previous epoch but not permeable with respect to pages associated with the current epoch. This process of checkpointing may continue until a fault occurs in file system 28, as shown in the example of FIG. 4G.

Referring to the example of FIG. 8G, file system 28 faults, where this fault is denoted by the lightning bolt in the block labeled "FS 28." At this point, page cache 30 stores a page 210F that was edited during the current epoch and a page 210G marked as being available to write to disk 212, meaning that this page is associated with the previous epoch. In response to the fault, recovery manager 38 is invoked to handle the file system fault, whereupon recovery manager 38 invokes thread management module 78 to unwind the in-process threads while also interfacing with recovery agent 48 to halt any pending threads from entering virtual file system 26 and thereby file system 28. After the processes are unwound, recovery manager 38 also invokes FS recovery manager module 80, which invokes FS mount manger module 82 to unmount file system 28.

FS mount manager module 82 unmounts file system 28 by clearing or otherwise deleting any dirty pages in page cache 30, such as page 210F. FIG. 8H illustrates the result of FS mount manager module 82 performing page stealing and dirty page deletion, where disk 212 is shown to store page 210G and page 210F has been deleted. Once these operations have been performed, recovery manager 38 invokes FS session restoration module 84 to restore file system 28 to the state it was in when the fault occurred. FS restoration module 84 then replays those operations logged to operation log 42A to restore the session of file systems 28, which effectively restores, in this example, page 210F within page cache 30. FIG. 8I illustrates the restoration of page 210F within page cache 30 after it had been previously cleared as shown in the example of FIG. 8H. At this point, recovery manager 38 may allow pending, but not-yet-started, file system operations to reach file system 28 and application 18A may receive responses to its previous operations that caused the fault. In this way, the file system restoration techniques may restore file system 28 without having to restart operating system 14 in its entirety.

Figure 9:
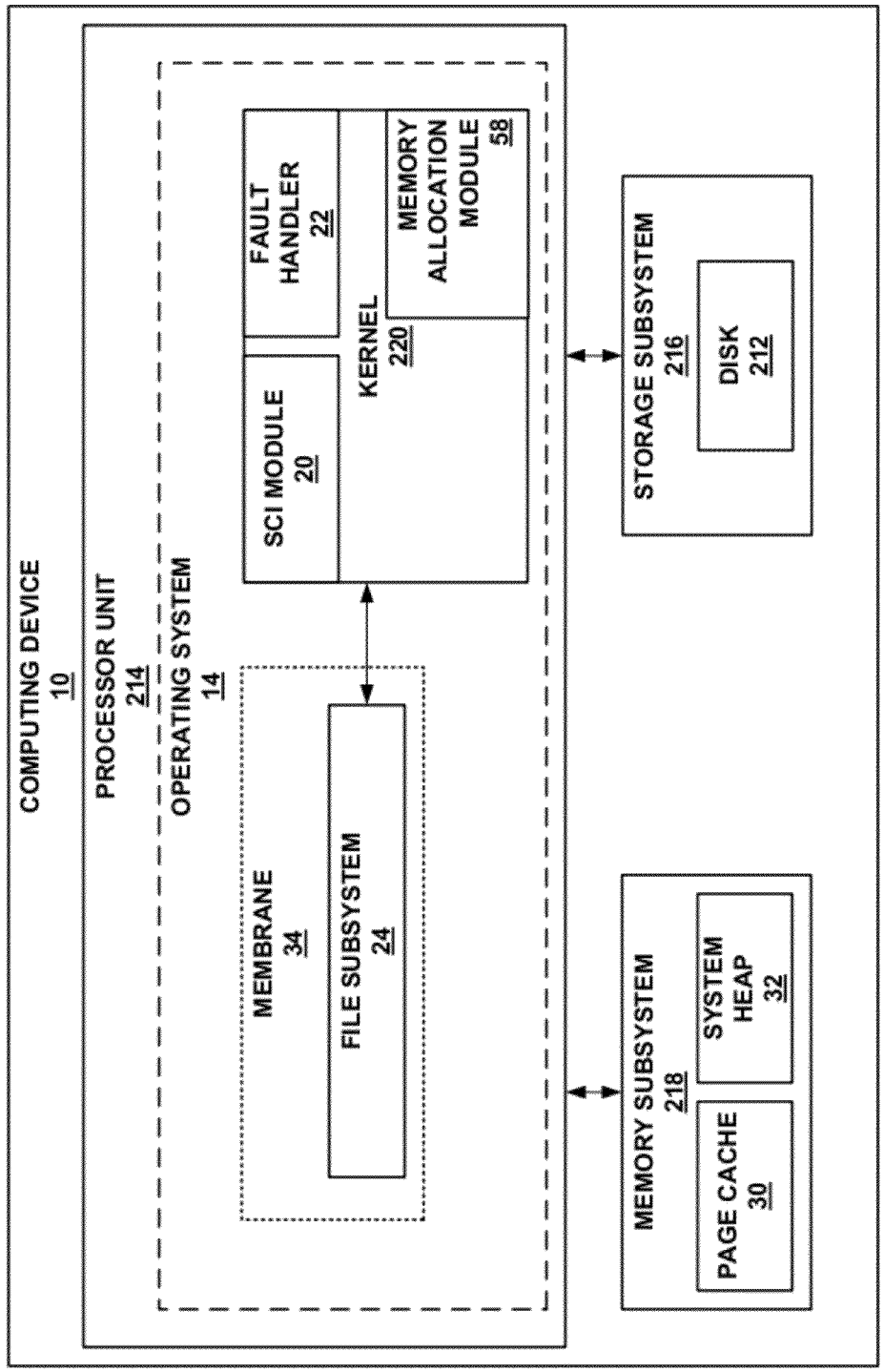
FIG. 9 is a block diagram illustrating various hardware aspects of the computing device shown in the example of FIG. 1 in more detail.

FIG. 9 is a block diagram illustrating various hardware aspects of computing device 10 in more detail. In the example of FIG. 9, computing device 10 includes a processor unit 214 that includes one or more processors, such as one or more central processing hardware units or CPUs and one or more graphical processing hardware units or GPUs. Processor unit 214 executes various portions of operating system 14, which typically resides or is stored to disk 212 of storage subsystem 216. Storage subsystem 216 represents a subsystem that manages persistent storage devices, such as disk 212 or other hard drives, solid-state drives, optical drives, flash drives or any other type of persistent storage devices. Computing device 10 also includes a memory subsystem 218 that comprises the RAM, SRAM, DRAM or any other types of memory modules. Memory subsystem 218 stores page cache 30 and system heap 32.

Also as shown in the example of FIG. 9, operating system 14 includes a kernel 220, which as described above, provides the core functionality of operating system 14. Kernel 220 includes SCI module 20, fault handler 22, memory allocation module 58 and many other modules not shown in the example of FIG. 9 for ease of illustration purposes. Kernel 220 interfaces with file system 24, which is protected by membrane 34. Membrane 34 represents those modules 36 and 38, as well as, their agents 46, 48, 52 and 60 that implement various aspects of the file restoration techniques described in this disclosure to provide a file system 28 capable of being restored without restarting operating system 14 or otherwise restarting computing device 10.

Various embodiments of the invention have been described. These and other embodiments are within the scope of the following claims.

The invention claimed is:

1. A method comprising:
   executing an operating system with a computing device to provide an operating environment for execution of a software application;
   receiving a request from the software application with the operating system, wherein the request specifies an operation to be performed by the operating system with respect to one of the plurality of files managed by a file system of the operating system;
   executing, with the computing device, one or more kernel functions of the operating system and one or more file system functions provided by program code of the file system to perform the operation, wherein the kernel functions call the file system functions to perform the operation, and wherein the file system functions also call the kernel functions to perform the operation;
   maintaining a stack with the computing device that stores data identifying those of the kernel functions that called the file system functions but not those of the file system functions that called the kernel functions;
   in response to determining that a first one of the file system functions that was called has failed, accessing the stack with the computing device to identify a first one of the kernel functions that most recently called a first one of the file system functions;
   returning control of execution to the identified first one of the kernel functions that most recently called the first one of the file system functions without executing any of the file system functions called after the first one of the kernel functions that most recently called the first one of the file system functions but before the first one of the file system functions that failed;
   detecting attempted execution of a second one of the file system functions after returning control of execution to the identified first one of the kernel functions;
   in response to detecting the attempted execution of the second one of the file system functions, accessing the stack to identify a second one of the kernel functions that most recently called the second one of the file system functions for which execution was attempted; and
   returning control of execution to the identified second one of the kernel functions without executing the second one of the file system functions.

2. The method of claim 1,
   wherein maintaining a stack comprises maintaining the stack to also store return values to be returned to those of the kernel functions that called the file system functions in response to a failure of first one of the file system functions called by the kernel functions;
   wherein the method further comprises accessing the stack to identify one of the return values associated with the first one of the kernel functions that most recently called the first one of the file system functions, and
   wherein returning control of execution to the identified first one of the kernel functions comprises returning the identified one of the return values to the identified first one of the kernel functions that most recently called the first one of the file system functions.

3. The method of claim 1, wherein detecting attempted execution of a second one of the file system functions includes:
   in response to determining that first one of the file system functions that was called has failed, halting a pending operation that has not been started by the file system to isolate the file system from the pending operation;
   marking all of the program code of the file system as non-executable; and
   when one of the kernel functions attempts to return control to one of the file system functions after the program code of the file system has been marked as non-executable, issuing a fault with the operating system,
   wherein accessing the stack to identify a second one of the kernel functions includes, to handle the fault issued by the operating system, accessing the stack with the computing device to identify the second one of the kernel functions that lead to the call of the first one of the file system functions to which control was attempted to be returned, and
   wherein returning control of execution to the identified second one of the kernel functions includes returning control of execution to the identified second one of the kernel functions that lead to the call of the second one of the file system functions.

4. The method of claim 1, further comprising:
   executing a checkpoint manager within the operating system to perform a checkpoint process on the file system to generate checkpoint data that identifies file system pages stored to a page cache that have been edited since a previous checkpoint process was performed on the file system; and
   in response to determining that the first one of the file system functions that was called has failed, restoring the file system to a state the file system was in when the checkpoint process was performed on the file system by at least storing the file system pages identified by the checkpoint data to a storage device so as not to lose any data that was edited since the previous checkpoint process was performed.

5. The method of claim 4, wherein executing the checkpoint manager within the operating system to perform the checkpoint process includes:
   halting a pending operation that has not been started by the file system to isolate the file system from the pending operation;
   marking the file system pages in the page cache that have been edited since the previous checkpoint process was performed on the file system as copy-on-write;
   storing the checkpoint data that identifies the file system pages stored to the page cache that have been edited since the previous checkpoint process was performed on the file system; and
   after marking the file system pages that have been edited since the previous checkpoint process was performed on the file system as copy-on-write, enabling the program code of the file system to execute the pending operation.

6. The method of claim 5, further comprising:
   after marking the one or more pages in the page cache that have been edited since a previous checkpoint process was performed on the page cache as copy-on-write, issuing a copy-on-write fault with the program code of the file system when attempting to write data to one of the file system pages marked as copy-on-write;

in response to the copy-on-write fault, copying the one of the file system pages marked as copy-on-write to which the program code of the file system attempted to write the data; and writing the data with the program code of the file system to the copy of the one of the file system pages marked as copy-on-write to which the file system attempted to write the data.

7. The method of claim 6, wherein restoring the file system to the state the file system was in when the checkpoint process was performed on the file system further comprises deleting the copy of the one of the file system pages to which the file system wrote the data when the write to the copy of the one of the file system pages marked as copy-on-write to which the file system attempted to write the data occurs prior to performing a subsequent checkpoint process on the file system.

8. The method of claim 1, further comprising:
storing data during the execution of the program code of the file system that enables restoration of the file system to the state the file system was in when the failure occurred; and in response to determining that the first one of the file system functions that was called has failed, restoring the file system to a state the file system was in when the failure occurred based on the logged data without restarting the operating system of the computing device.

9. The method of claim 8,
wherein storing data during the execution of the file system comprises storing operation data that defines operations performed by the file system with respect to the plurality of files managed by the file system, and wherein restoring the file system to the state the file system was in when the failure occurred based on the logged data comprises performing the operations defined by the logged operation data again with the file system to restore the file system to the state the file system was in when the failure occurred.

10. The method of claim 8,
wherein storing data during the execution of the file system comprises storing session data that defines which of the plurality of files were open when the file system failed and a current position accessed of the file system within those of the plurality of files that were open when the file system failed, and wherein restoring the file system to the state the file system was in when the failure occurred based on the logged data comprises:
opening those of the plurality of files defined by the session data that were open when the file system failed; and configuring the file system to point to the current position defined by the session data for each of those of the plurality of files that were open when the file system failed.

11. The method of claim 8,
wherein storing data during the execution of the file system comprises storing memory allocation data identifying memory that was dynamically allocated to the file system during execution of the file system; and wherein restoring the file system to the state the file system was in when the failure occurred based on the logged data comprises releasing the memory that was dynamically allocated to the file system identified by the memory allocation data.

12. The method of claim 8,
wherein storing data during the execution of the file system comprises storing lock data identifying those of the plurality of files managed by the file system that were locked when the file system failed, and wherein restoring the file system to the state the file system was in when the failure occurred based on the logged data comprises releasing the locks identified by the lock data for those of the plurality of files managed by the file system that were locked when the file system failed.

13. The method of claim 1, further comprising:
executing a checkpoint manager within the operating system to periodically perform a checkpoint process on the file system to generate checkpoint data that identifies file system pages stored to a page cache that have been edited since a previous checkpoint process was performed on the file system;

storing log data during the execution of the program code of the file system that enables restoration of the file system to the state the file system was in when the failure occurred; and in response to determining that the first one of the file system functions that was called has failed, restoring the file system to a state the file system was in when the failure occurred based on the checkpoint data and the stored log data without restarting the operating system of the computing device.

14. The method of claim 13, further comprising discarding the logged data stored between performing a first one of the periodic checkpoint processes and a second one of the periodic checkpoint processes after completing the second one of the periodic checkpoint processes.

15. The method of claim 13, wherein storing the log data during the execution of the file system comprises:
storing operation data that defines operations performed by the file system with respect to the plurality of files managed by the file system;

storing session data that defines which of the plurality of files were open when the file system failed and a current position accessed of the file system within those of the plurality of files that were open when the file system failed;

storing memory allocation data identifying memory that was dynamically allocated to the file system during execution of the file system;

storing lock data identifying those of the plurality of files managed by the file system that were locked when the file system failed; and storing unwind data identifying function calls by a kernel of the operating system to the file system and return values to be returned to the kernel in response to a file system failure.

16. The method of claim 1, further comprising:
determining with either of a software fault handler module or a hardware fault handler module of the operating system that a code segment that faulted, wherein the software fault handler applies extensible programmer defined software assertions and checks to determine that the code segment has faulted;

determining with either of the software fault handler module or the hardware fault handler module of the operating system whether this faulted code segment is associated with a file system function;

in response to determining that the faulted code segment is associated with the file system function, determining with either of the software fault handler module or the hardware fault handler module of the operating system that the first one of the file system functions that was called has failed; and in response to determining that the first one of the file system functions that was called has failed, transferring control from either of the software fault handler module or the hardware fault handler module of the operating system to a file system recovery module of the operating system, wherein the file system recovery module accesses the stack with the computing device to identify the first one of the kernel functions that most recently called the first one of the file system functions that failed.

17. The method of claim 16, further comprising, in response to determining frequently repeated file system function failures and subsequent restoration of the file system to the software application, returning an error to the software application indicating a non-transient failure.

18. The method of claim 1, further comprising:

in response to determining that the first one of the file system functions that was called has failed, restoring, with the computing device, the file system to a state of the file system prior to the occurrence of the failure without restarting the operating system of the computing device; and returning, with the program code of the restored file system, a response to the software application that issued the request without indicating the failure and subsequent restore of the file system to the software application.

19. A computing device comprising:

a processor;

a storage device that stores at least some of a plurality of files; and an operating system executed by the processor to provide an operating environment for execution of a software application and receive a request from the software application executing in the operating environment, wherein the request specifies an operation to be performed by the operating system with respect to one of the plurality of files managed by a file system of the operating system, wherein the processor executes one or more kernel functions of the operating system and one or more file system functions provided by program code of the file system to perform the operation, wherein the kernel functions call the file system functions to perform the operation, and wherein the file system functions also call the kernel functions to perform the operation, wherein the operating system maintains a stack that stores data identifying those of the kernel functions that called the file system functions but not those of the file system functions that called the kernel functions, in response to determining that a first one of the file system functions that was called has failed, accesses the stack to identify a first one of the kernel functions that most recently called the first one of the file system functions, returns control of execution to the identified first one of the kernel functions that most recently called the first one of the file system functions without executing any of the file system functions called after the first one of the kernel functions that most recently called the first one of the file system functions but before the first one of the file system functions that failed, detects attempted execution of a second one of the file system functions after returning control of execution to the identified first one of the kernel functions, in response to detecting the attempted execution of the second one of the file system functions, accessing the stack to identify a second one of the kernel functions that most recently called the second one of the file system functions for which execution was attempted, and returns control of execution to the identified second one of the kernel functions without executing the second one of the file system functions.

20. The computing device of claim 19, wherein the operating system maintains the stack to also store return values to be returned to those of the kernel functions that called the file system functions in response to determining a failure of the first one of the file system functions called by the kernel functions, accesses the stack to identify one of the return values associated with the first one of the kernel functions that most recently called the first one of the file system functions, and returns the identified one of the return values to the identified first one of the kernel functions that most recently called the first one of the file system functions.

21. The computing device of claim 19, wherein the operating system, in response to determining that the first one of the file system functions that was called has failed, halts a pending operation that has not been started by the file system to isolate the file system from the pending operation, marks all of the program code of the file system as non-executable, issues a fault when one of the kernel functions attempts to return control to the second one of the file system functions after the program code of the file system has been marked as non-executable, to handle the fault issued by the operating system, accesses the stack with the computing device to identify the second one of the kernel functions that lead to the call of the second one of the file system functions to which control was attempted to be returned, and returns control of execution to the identified second one of the kernel functions that lead to the call of the second one of the file system functions to which control was attempted to be returned.

22. The computing device of claim 19, wherein the operating system includes a checkpoint manager to perform a checkpoint process on the file system to generate checkpoint data that identifies file system pages stored to a page cache that have been edited since a previous checkpoint process was performed on the file system, and wherein the checkpoint manager, in response to determining that the first one of the file system functions that was called has failed, stores the file system pages identified by the checkpoint data to a storage device so as not to lose any data that was edited since the previous checkpoint process was performed.

23. The computing device of claim 22, wherein the checkpoint manager further halts a pending operation that has not been started by the file system to isolate the file system from the pending operation, marks the file system pages in the page cache that have been edited since the previous checkpoint process was performed on the file system as copy-on-write, stores the checkpoint data that identifies the file system pages stored to the page cache that have been edited since the previous checkpoint process was performed on the file system and, after marking the file system pages that have been edited since the previous checkpoint process was performed on the file system as copy-on-write, enabling the program code of the file system to execute the pending operation.

24. The computing device of claim 23, wherein the program code of the file system, after the checkpoint manager has marked the one or more pages in the page cache that have been edited since a previous checkpoint process was performed on the page cache as copy-on-write, issues a copy-on-write fault when attempting to write data to one of the file system pages marked as copy-on-write, wherein the operating system includes a fault handler that, in response to the copy-on-write fault, copies the one of the file system pages marked as copy-on-write to which the program code of the file system attempted to write the data, and wherein the program code of the file system writes the data to the copy of the one of the file system pages marked as copy-on-write to which the file system attempted to write the data.

25. The computing device of claim 24, wherein the operating system further includes a recovery manager that deletes the copy of the one of the file system pages to which the file system wrote the data when the write to the copy of the one of the file system pages marked as copy-on-write to which the file system attempted to write the data occurs prior to performing a subsequent checkpoint process on the file system.

26. The computing device of claim 19, wherein the operating system includes a checkpoint manager that stores data during the execution of the program code of the file system that enables restoration of the file system to the state the file system was in when the failure occurred; and wherein the operating system also includes a recovery manager that, in response to determining that the first one of the file system functions that was called has failed, restores the file system to a state the file system was in when the failure occurred based on the logged data without restarting the operating system of the computing device.

27. The computing device of claim 26, wherein the checkpoint manager stores operation data that defines operations performed by the file system with respect to the plurality of files managed by the file system, and wherein the recovery manager performs the operations defined by the logged operation data again with the file system to restore the file system to the state the file system was in when the failure occurred.

28. The computing device of claim 26, wherein the checkpoint manager stores session data that defines which of the plurality of files were open when the file system failed and a current position accessed of the file system within those of the plurality of files that were open when the file system failed, and wherein the recovery manager opens those of the plurality of files defined by the session data that were open when the file system failed and configures the file system to point to the current position defined by the session data for each of those of the plurality of files that were open when the file system failed.

29. The computing device of claim 26, wherein the checkpoint manager stores memory allocation data identifying memory that was dynamically allocated to the file system during execution of the file system; and wherein the recovery manager releases the memory that was dynamically allocated to the file system identified by the memory allocation data.

30. The computing device of claim 26, wherein the checkpoint manager stores lock data identifying those of the plurality of files managed by the file system that were locked when the file system failed, and wherein the recovery manager releases the locks identified by the lock data for those of the plurality of files managed by the file system that were locked when the file system failed.

31. The computing device of claim 19, wherein the operating system includes a checkpoint manager that periodically performs a checkpoint process on the file system to generate checkpoint data that identifies file system pages stored to a page cache that have been edited since a previous checkpoint process was performed on the file system, stores log data during the execution of the program code of the file system that enables restoration of the file system to the state the file system was in when the failure occurred, and wherein the operating system includes a recovery manager that, in response to determining that the first one of the file system functions that was called has failed, restores the file system to a state the file system was in when the failure occurred based on the checkpoint data and the stored log data without restarting the operating system of the computing device.

32. The computing device of claim 31, wherein the checkpoint manager discards the logged data stored between performing a first one of the periodic checkpoint processes and a second one of the periodic checkpoint processes after completing the second one of the periodic checkpoint processes.

33. The computing device of claim 31, wherein the checkpoint manager further stores operation data that defines operations performed by the file system with respect to the plurality of files managed by the file system, stores session data that defines which of the plurality of files were open when the file system failed and a current position accessed of the file system within those of the plurality of files that were open when the file system failed, stores memory allocation data identifying memory that was dynamically allocated to the file system during execution of the file system, stores lock data identifying those of the plurality of files managed by the file system that were locked when the file system failed, and stores unwind data identifying function calls by a kernel of the operating system to the file system and return values to be returned to the kernel in response to a file system failure.

34. The computing device of claim 19, wherein the operating system includes both a software fault handler module and a hardware fault handler module, wherein one of the software fault handler module and the hardware fault handler module determine that a code segment that faulted, wherein the software fault handler performs one or more of an extensible programmer defined software assertion and an extensible programmer defined software check to determine that a code segment has faulted, wherein one of the software fault handler module and the hardware fault handler module determines whether this faulted code segment is associated with a file system function, in response to determining that the faulted code segment is associated with the file system function, determines with either of the software fault handler module or the hardware fault handler module of the operating system that the first one of the file system functions that was called has failed and, in response to determining that first one of the file system functions that was called has failed, transfers control from either of the software fault handler module or the hardware fault handler module of the operating system to a file system recovery module of the operating system, and wherein the file system recovery module accesses the stack with the computing device to identify the first one of the kernel functions that most recently called the first one of the file system functions that failed.

35. The computing device of claim 34, wherein file system recovery module, in response to determining frequently repeated file system function failures and subsequent restoration of the file system to the software application, returns an error to the software application indicating a non-transient failure.

36. The computing device of claim 19,
wherein the operating system includes a recovery manager that, in response to determining that the first one of the file system functions that was called has failed, restores the file system to a state of the file system prior to the occurrence of the failure without restarting the operating system of the computing device, and
wherein the program code of the restored file system returns a response to the software application that issued the request without indicating the failure and subsequent restore of the file system to the software application.

37. A non-transitory computer-readable medium comprising instructions that, when executed, cause one or more processors to:
execute an operating system to provide an operating environment for execution of a software application;
receive a request from the software application with the operating system, wherein the request specifies an operation to be performed by the operating system with respect to one of the plurality of files managed by a file system of the operating system;
execute one or more kernel functions of the operating system and one or more file system functions provided by program code of the file system to perform the operation, wherein the kernel functions call the file system functions to perform the operation, and wherein the file system functions also call the kernel functions to perform the operation;
maintain a stack that stores data identifying those of the kernel functions that called the file system functions but not those of the file system functions that called the kernel functions;
in response to determining that a first one of the file system functions that was called has failed, access the stack to identify a first one of the kernel functions that most recently called one of the file system functions;
return control of execution to the identified first one of the kernel functions that most recently called the first one of the file system functions without executing any of the file system functions called after the first one of the kernel functions that most recently called the first one of the file system functions that failed but before the first one of the file system functions that failed;
detect attempted execution of a second one of the file system functions after returning control of execution to the identified first one of the kernel functions;
in response to detecting the attempted execution of the second one of the file system functions, access the stack to identify a second one of the kernel functions that most recently called the second one of the file system functions for which execution was attempted; and
return control of execution to the identified second one of the kernel functions without executing the second one of the file system functions.

38. The non-transitory computer-readable medium of claim 37, further comprising instructions that, when executed, cause the one or more processors to:
maintain the stack to also store return values to be returned to those of the kernel functions that called the file system functions in response to a failure of one of the file system functions called by the kernel functions;
access the stack to identify one of the return values associated with the first one of the kernel functions that most recently called the first one of the file system functions; and
return the identified one of the return values to the identified first one of the kernel functions that most recently called the first one of the file system functions.

39. The non-transitory computer-readable medium of claim 37, further comprising instructions that, when executed, cause the one or more processors to:
in response to determining that first one of the file system functions that was called has failed, halt a pending operation that has not been started by the file system to isolate the file system from the pending operation;
mark all of the program code of the file system as non-executable;
when one of the kernel functions attempts to return control to the second one of the file system functions after the program code of the file system has been marked as non-executable, issue a fault with the operating system;
to handle the fault issued by the operating system, access the stack with the computing device to identify the second one of the kernel functions that lead to the call of the second one of the file system functions to which control was attempted to be returned; and
return control of execution to the identified second one of the kernel functions that lead to the call of the second one of the file system functions to which control was attempted to be returned.

40. The non-transitory computer-readable medium of claim 37, further comprising instructions that, when executed, cause the one or more processors to:
execute a checkpoint manager within the operating system to perform a checkpoint process on the file system to generate checkpoint data that identifies file system pages stored to a page cache that have been edited since a previous checkpoint process was performed on the file system; and
in response to determining that the first one of the file system functions that was called has failed, restore the file system to a state the file system was in when the checkpoint process was performed on the file system by at least storing the file system pages identified by the checkpoint data to a storage device so as not to lose any data that was edited since the previous checkpoint process was performed.

41. The non-transitory computer-readable medium of claim 40, further comprising instructions that, when executed, cause the one or more processors to:
halt a pending operation that has not been started by the file system to isolate the file system from the pending operation;
mark the file system pages in the page cache that have been edited since the previous checkpoint process was performed on the file system as copy-on-write;
store the checkpoint data that identifies the file system pages stored to the page cache that have been edited since the previous checkpoint process was performed on the file system; and
after marking the file system pages that have been edited since the previous checkpoint process was performed on the file system as copy-on-write, enable the program code of the file system to execute the pending operation.

42. The non-transitory computer-readable medium of claim 41, further comprising instructions that, when executed, cause the one or more processors to:

after marking the one or more pages in the page cache that have been edited since a previous checkpoint process was performed on the page cache as copy-on-write, issue a copy-on-write fault with the program code of the file system when attempting to write data to one of the file system pages marked as copy-on-write;

in response to the copy-on-write fault, copy the one of the file system pages marked as copy-on-write to which the program code of the file system attempted to write the data; and write the data with the program code of the file system to the copy of the one of the file system pages marked as copy-on-write to which the file system attempted to write the data.

43. The non-transitory computer-readable medium of claim 37, further comprising instructions that, when executed, cause the one or more processors to delete the copy of the one of the file system pages to which the file system wrote the data when the write to the copy of the one of the file system pages marked as copy-on-write to which the file system attempted to write the data occurs prior to performing a subsequent checkpoint process on the file system.

44. The non-transitory computer-readable medium of claim 37, further comprising instructions that, when executed, cause the one or more processors to:

store data during the execution of the program code of the file system that enables restoration of the file system to the state the file system was in when the failure occurred; and in response to determining that the first one of the file system functions that was called has failed, restore the file system to a state the file system was in when the failure occurred based on the logged data without restarting the operating system of the computing device.

45. The non-transitory computer-readable medium of claim 44, further comprising instructions that, when executed, cause the one or more processors to:

storing operation data that defines operations performed by the file system with respect to the plurality of files managed by the file system, and in response to determining that the first one of the file system functions that was called has failed, perform the operations defined by the logged operation data again with the file system to restore the file system to the state the file system was in when the failure occurred.

46. The non-transitory computer-readable medium of claim 44, further comprising instructions that, when executed, cause the one or more processors to:

store session data that defines which of the plurality of files were open when the file system failed and a current position accessed of the file system within those of the plurality of files that were open when the file system failed;

in response to determining that the first one of the file system functions that was called has failed, open those of the plurality of files defined by the session data that were open when the file system failed and configure the file system to point to the current position defined by the session data for each of those of the plurality of files that were open when the file system failed.

47. The non-transitory computer-readable medium of claim 44, further comprising instructions that, when executed, cause the one or more processors to:

store memory allocation data identifying memory that was dynamically allocated to the file system during execution of the file system; and in response to determining that the first one of the file system functions that was called has failed, release the memory that was dynamically allocated to the file system identified by the memory allocation data.

48. The non-transitory computer-readable medium of claim 44, further comprising instructions that, when executed, cause the one or more processors to:

store lock data identifying those of the plurality of files managed by the file system that were locked when the file system failed; and in response to determining that the first one of the file system functions that was called has failed, release the locks identified by the lock data for those of the plurality of files managed by the file system that were locked when the file system failed.

49. The non-transitory computer-readable medium of claim 37, further comprising instructions that, when executed, cause the one or more processors to:

execute a checkpoint manager within the operating system to periodically perform a checkpoint process on the file system to generate checkpoint data that identifies file system pages stored to a page cache that have been edited since a previous checkpoint process was performed on the file system;

store log data during the execution of the program code of the file system that enables restoration of the file system to the state the file system was in when the failure occurred; and in response to determining that the first one of the file system functions that was called has failed, restore the file system to a state the file system was in when the failure occurred based on the checkpoint data and the stored log data without restarting the operating system of the computing device.

50. The non-transitory computer-readable medium of claim 49, further comprising instructions that, when executed, cause the one or more processors to discard the logged data stored between performing a first one of the periodic checkpoint processes and a second one of the periodic checkpoint processes after completing the second one of the periodic checkpoint processes.

51. The non-transitory computer-readable medium of claim 49, further comprising instructions that, when executed, cause the one or more processors to store the log data during the execution of the file system by at least storing operation data that defines operations performed by the file system with respect to the plurality of files managed by the file system, storing session data that defines which of the plurality of files were open when the file system failed and a current position accessed of the file system within those of the plurality of files that were open when the file system failed, storing memory allocation data identifying memory that was dynamically allocated to the file system during execution of the file system, storing lock data identifying those of the plurality of files managed by the file system that were locked when the file system failed and storing unwind data identifying function calls by a kernel of the operating system to the file system and return values to be returned to the kernel in response to a file system failure.

52. The non-transitory computer-readable medium of claim 37, further comprising instructions that, when executed, cause the one or more processors to:

determine with either of a software fault handler module or a hardware fault handler module of the operating system that a code segment that faulted, wherein the software fault handler module performs one or more of extensible programmer defined software assertions and checks to determine that the code segment has faulted;

determine with either of the software fault handler module or the hardware fault handler module of the operating system whether this faulted code segment is associated with a file system function;

in response to determining that the faulted code segment is associated with the file system function, determine with either of the software fault handler module or the hardware fault handler module of the operating system that the first one of the file system functions that was called has failed; and in response to determining that the first one of the file system functions that was called has failed, transfer control from either of the software fault handler module or the hardware fault handler module of the operating system to a file system recovery module of the operating system.

53. The non-transitory computer-readable medium of claim 52, further comprising instructions that cause the processor to, in response to determining frequently repeated file system function failures and subsequent restoration of the file system to the software application, return an error to the software application indicating a non-transient failure.

54. The non-transitory computer-readable medium of claim 37, further comprising instructions that, when executed, cause the one or more processors to:

in response to determining that the first one of the file system functions that was called has failed, restore the file system to a state of the file system prior to the occurrence of the failure without restarting the operating system of the computing device; and return a response to the software application that issued the request without indicating the failure and subsequent restore of the file system to the software application.

55. A method comprising:

executing a first software module with one or more computing devices;

executing a second software module different than the first software module with the one or more computing devices; wherein the first software module calls one or more functions of the second software module to perform an operation, and wherein the second software module calls one or more functions of the first software module to perform the operation;

maintaining a stack with the one or more computing devices that stores data identifying those of the one or more functions of the first software module that called the one or more functions of the second software module but not those of the one or more functions of the second software module that called the one or more functions of the first software module;

in response to determining that one of the one or more functions of the second software module that was called has failed, accessing the stack with the one or more computing devices to identify a first one of the one or more functions of the first software module that most recently called a first one of the one or more functions of the second software module; and returning control of execution to the identified first one of the one or more functions of the first software module that most recently called the first one of the one or more functions of the second software module without executing any of the one or more functions of the second software module called after the first one of the one or more functions of the first software module that most recently called the first one of the one or more functions of the second software module but before the first one of the one or more functions of the second software module that failed;

detecting attempted execution of a second one of the functions of the second software module after returning control of execution to the identified first one of the functions of the first software module;

in response to detecting the attempted execution of the second one of the functions of the second software module, accessing the stack to identify a second one of the functions of the first software module that most recently called the second one of the functions of the second software module for which execution was attempted; and returning control of execution to the identified second one of the functions of the first software module without executing the second one of the functions of the second software module.

\* \* \* \* \*